US008134999B2

United States Patent
Ong et al.

(10) Patent No.: US 8,134,999 B2
(45) Date of Patent: Mar. 13, 2012

(54) GENERIC PROVISIONING OF VOICE OVER INTERNET PROTOCOL (VOIP)

(75) Inventors: Piu Piu Ong, San Ramon, CA (US); Manrique Brenes, Corona del Mar, CA (US); Ray Chang, Irvine, CA (US); Luan Dang, Newport Beach, CA (US); Andrew M. Gutman, Foothill Ranch, CA (US); Yutai T. Koh, San Diego, CA (US); Edward Dean Willis, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1526 days.

(21) Appl. No.: 11/099,268

(22) Filed: Apr. 5, 2005

(65) Prior Publication Data

US 2006/0221940 A1 Oct. 5, 2006

(51) Int. Cl.
*H04L 12/66* (2006.01)

(52) U.S. Cl. ........ 370/352; 370/389; 370/401; 370/453; 370/395.2; 370/395.3

(58) Field of Classification Search .................. 370/352, 370/389, 401, 222; 379/355.02, 88.2, 88.19, 379/88.21, 127.06, 207.15
See application file for complete search history.

(56) References Cited

U.S. PATENT DOCUMENTS

| 6,577,642 B1* | 6/2003 | Fijolek et al. ................ 370/465 |
| 6,614,781 B1* | 9/2003 | Elliott et al. ................ 370/352 |
| 6,657,991 B1* | 12/2003 | Akgun et al. ................ 370/352 |
| 7,215,663 B1* | 5/2007 | Radulovic ................ 370/356 |
| 2004/0218540 A1* | 11/2004 | Foschiano et al. ............ 370/241 |
| 2005/0160175 A1* | 7/2005 | Ho ................ 709/228 |
| 2005/0182937 A1* | 8/2005 | Bedi ................ 713/171 |
| 2005/0213567 A1* | 9/2005 | Mullins et al. ................ 370/352 |

* cited by examiner

*Primary Examiner* — Joseph J Nguyen
(74) *Attorney, Agent, or Firm* — Haynes and Boone, LLP

(57) ABSTRACT

In accordance with an embodiment of the invention, a provisioning method for establishing a telecommunications service including the operations of sending a resynchronization message to a user terminal unit, redirecting the resynchronization message to a customer premises equipment (CPE) unit, acquiring the configuration server network address from the resynchronization message, connecting the CPE unit through the network to a configuration server specified in the configuration server network address, receiving subscriber configuration data from the configuration server; and initializing the CPE unit with the received subscriber configuration data to establish service between the CPE unit and the telecommunications service provider.

19 Claims, 14 Drawing Sheets

GENERIC PROVISIONING OF VOICE OVER INTERNET PROTOCOL (VOIP)

TECHNICAL FIELD

This invention relates generally to electronic communication over a network, and more particularly to the provisioning of Voice Over Internet Protocol (VoIP) service over the Internet.

BACKGROUND

Subscriber provisioning involves the allocation of network resources and the configuration of network equipment to establish network services for the first time. VoIP services comprise an emerging market that capitalizes on the pervasive nature of our existing data services and the Internet. A potential subscriber may approach the initiation of VoIP services from many different starting points, determined largely by the subscriber's preferences, security needs, and existing network equipment. The process of setting into place and configuring the necessary hardware and software to establish VoIP services can vary significantly depending on the starting point of the subscriber. This variability can lead to significant costs for an equipment manufacturer or a service provider due to increased equipment options as well as the complexity of supporting diverse provisioning operations. Accordingly, there is a need in the art for a generic and flexible method to securely accommodate the various starting points for establishing VoIP service.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Figure 1:
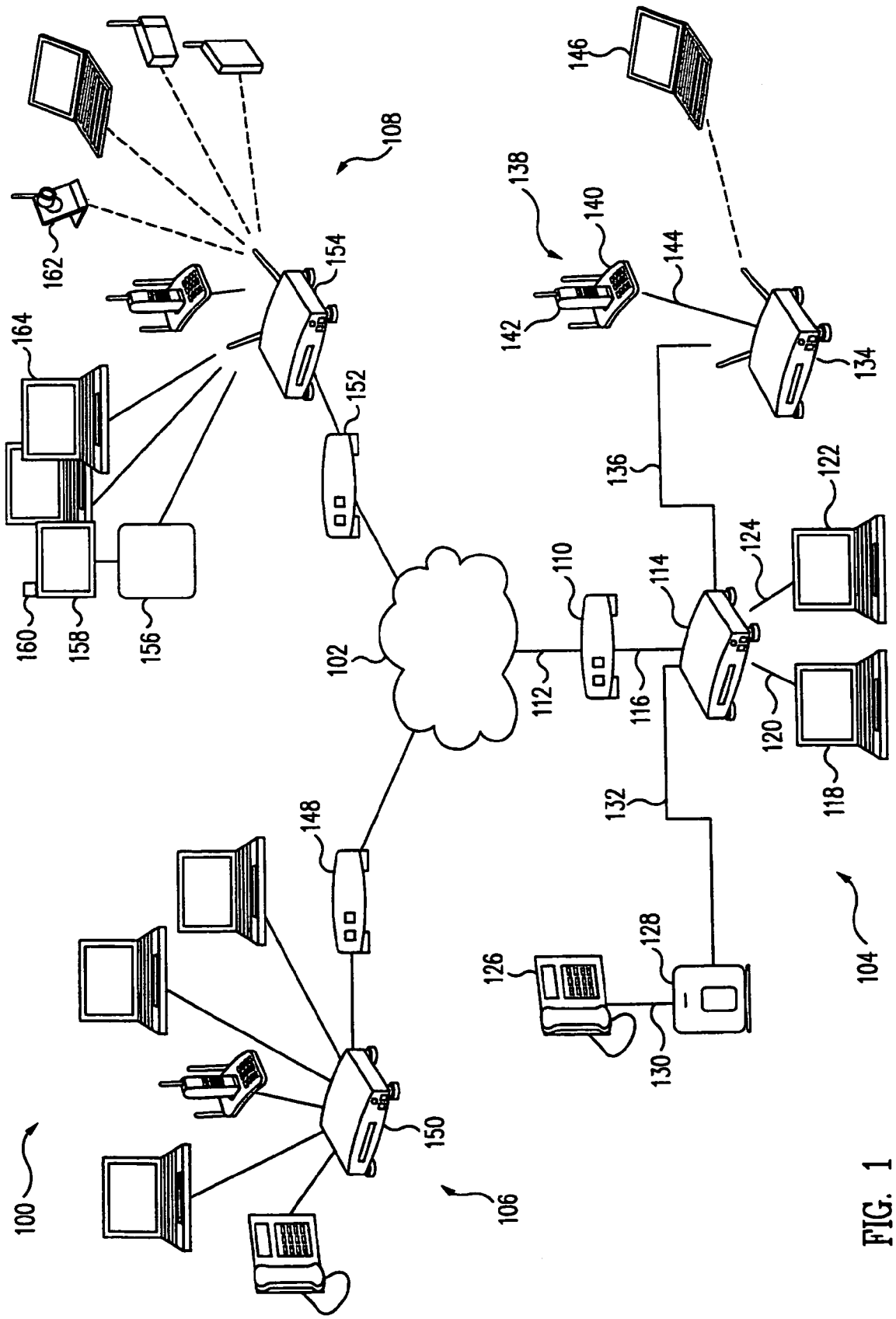
FIG. 1 shows an exemplary interconnected system of packet-switched computer communication networks comprising a portion of the ubiquitous Internet, in accordance with an embodiment of the invention.

In reference to FIG. 1, an exemplary interconnected system 100 of packet-switched computer communication networks is illustrated, comprising a portion of the ubiquitous Internet 102. Digital information is exchanged on Internet 102 according to the internet protocol (IP) by transmitting messages in blocks of data called data packets from sources to destinations, where the sources and destinations are network devices identified by fixed-length addresses. IP also provides for segmentation and reassembly of long messages, if necessary. This example system 100 includes a number of clusters (104, 106, 108) illustrating a exemplary portion of the world-wide Internet 102. Each network cluster can actually reside at great geographic distances from each other, such as on different continents.

A first cluster 104 includes a modem 110 for direct connection to the Internet 102 through a communications channel 112 such as a twisted-pair phone lines, a coaxial cable, or an optical link. Modem 110 provides the signaling necessary for the first cluster to connect to and communicate with a corresponding modem (not shown) typically belonging to an Internet Service Provider (ISP). Modem 110, can also termed a gateway modem or gateway router, and may include a digital subscriber line (DSL) or cable modem in series with a router for direct connection to Internet 102. It is understood that each modem connects directly to another modem which may have a subsequent connection through a router to another network to other network devices so that Internet 102 includes a plurality of hierarchical interconnection networks.

First cluster 104 includes customer premises equipment (CPE) 114, such as a local network router 114, for direct connection to modem 110, usually through a digital communications channel 116. The term CPE is widely used and can refer to any communications equipment present at a customer site. Although both modem 110 and router 114 are installed on the customer site, for the purposes of this disclosure, the term CPE will be exclusive to a router 114, or similar device, that may be connected directly to a modem 110, or else connected indirectly to modem 110 through an intermediate router 114. CPE 114, as a router, is typically a device that forwards data packets along networks based on their addresses, and efficiently manages the information flow to and from modem 110. Routers are typically connected to at least two networks at a place where the two networks connect in order to allow communication, or message packet passing, between the two networks. More than one router can be connected to modem 110 if modem 110 is also a gateway incorporating both modem and router functions, but each cluster is shown with only one router for simplicity.

Networks can be hierarchical where one router connects to another like branches in a tree and the actual networked devices, or user terminals, can be considered as leaves on the tree. If the scope of a network is relatively wide, it can be arbitrarily considered as a Wide Area Network (WAN), while each cluster (104, 106, 108) being relatively small and comprising networked devices can be considered a local network may be called a Local Area Network (LAN). Routers such as CPE 114 are often connected between a WAN and a LAN. First cluster 104 includes several local network devices such as a first computer 118 connected to CPE 114 through a fixed communications channel 120 such as a data cable, and second computer 122 connected to router 114 through a data cable 124. First computer 118 and second computer 122 connected through CPE 114 comprise a traditional LAN where each device may exchange messages with each other within the LAN where CPE 114 forwards the messages only on the LAN connection side and does not pass the message traffic beyond the LAN. Further, each computer (118, 122) may exchange messages with devices outside the LAN where CPE 114 directs the messages outside the LAN. Since each computer (118, 122) is operating on the network, each also has a unique internet protocol (IP) address. A network address translator (NAT) may be employed to translate between WAN network addresses and LAN network addresses.

A user device 126, such as a traditional analog telephone 126, can be used with Voice Over Internet Protocol (VoIP) technology to place and receive telephone calls using Internet 102, even though the user device by itself cannot access the network. Instead, by converting the telephone output signals from their analog form into outbound network messages, and converting inbound messages into input telephone signals, the user device 126 can interface with a terminal adapter (TA) 128. In this manner, analog telephone 126 connects to a first port on terminal adapter 128 through a communication channel such as a standard telephone line 130.

Terminal adapter 128 converts the analog telephone 126 signals to digital packets and accesses the network through a second port connected to CPE 114 through a communication channel 132, such as a data cable. In this manner, terminal adapter 128 can provide network connectivity for an otherwise non-accessible user device. In this example, terminal adapter 128 is configured to interface with an analog telephone 126 which can function as a network device through terminal adapter 128. Alternatively, CPE 114 can integrate the capabilities of terminal adapter 128 in order to permit the direct connection of a user terminal, such as a telephone, to CPE 114. Various types of terminal adapters may be used to interface with other user devices. For example, a different type of terminal adapter 128 may be used to interface with a camera, a video monitor, or a hand-held device in order to provide network connectivity to these devices. In this manner, terminal adapter 128 is the final, or terminal element on the network.

For data file transmissions, such as electronic mail or document transfers, network latency, or delay, is not an issue since the entire data message is eventually reassembled once all the data packets are received. However, in a VoIP application, latency can be an issue when the latency becomes sufficiently large so as to interfere with normal speech communications. Quality of Service (QoS), including minimal latency and jitter, can be managed by routing voice message packets based on a priority queue. Finally, regarding first cluster 104, a wireless router 134, having a both a wireless and a wired channel capability, is connected to CPE 114 through a wired connection 136, such as a data cable. In this manner, wireless router 134 forms a sub-network, and cluster 104 becomes a hierarchical network where wireless router 134 is situated at the junction between the two networks. In another embodiment, wireless router 134 can be CPE 134, within the scope of the present disclosure.

A hand-held telephone 138 includes a wired base-station 140 and a wireless hand-held unit 142, where the wired base station 140 is connected to wireless router 134 through a fixed wire connection 144, such as a standard telephone cable. In this case, router 134 integrates the capabilities of a phone adapter for allowing connection of telephone 138 to the network. A computer 146 having wireless networking capability can connect through a wireless channel 148 to wireless router 134. In this manner, computer 146 can remain connected to the wireless sub-network as long as computer 146 remains within range of wireless router 134 to maintain an adequate signal. Alternatively, wireless router 134 can also be a wired router, and CPE 114 can include wireless connectivity. First cluster 104 includes a number of diverse, networked devices (118, 122, 128, 134, 138, 146) and is intended to be exemplary in nature. Other devices may be added or illustrated devices removed depending on the needs of users of first cluster 104. Similarly, wired connections may be replaced with wireless connections, and vice versa.

Second cluster 106 includes a modem 148 and a CPE 150 with a number of diverse networked devices connected using fixed wire channels, as described above. Third cluster 108 includes a modem 152 and a CPE 154 with a number of diverse networked devices connected using an assortment of fixed wire channels or wireless channels, as described above. Third cluster 108 includes a terminal adapter 156 connected to a first monitor 158 and a first camera 160.

Terminal adapter 156 converts data messages from the network intended for first monitor 158 into video signals from which first monitor 158 produces an output that can include both audio and visual output. Terminal adapter 156 converts a video signal output from first camera 160 into messages that may be sent over the network. In this manner, a multimedia service provider (MSP) can deliver video data, such as online movies, news broadcasts, and video conferencing, to one or more devices on third cluster 108. Alternatively, a second camera 162 integrates the capabilities of a terminal adapter to provide conversion of captured images into messages for sending over the network. A computer 164 can integrate the capabilities of a terminal adapter by converting received messages into video and/or audio representation. Alternatively, a customer can subscribe to an exclusive data service provided by an internet service carrier (ISC), such as a news or research service, where access to the internet service is provided through CPE 154 for one or more of the network devices on third cluster 108. The ISC can provide access for any network device on the subscribed cluster. In this manner, a wide variety of services may be provisioned by setting into place and configuring CPE 154 to enable telecommunications services for one or more subscribers.

Although three clusters are illustrated, the actual scope of Internet 102 is world-wide, and can encompass all forms of electronic telecommunications through one or more adapter units, such as terminal adapter 128. While Internet communications can encompass diverse forms and methods of communication, some preparation may be required in order to set into place and configure the hardware and software required to activate a particular telecommunications service for a user. This preparation and configuration to initiate a new service is considered provisioning, and may utilize hardware and/or software already in place or require the addition of new hardware or software. More specifically, provisioning may require creating or modifying a customer record stored in a database and associating that customer record with a particular telecommunication service provider to which the customer has subscribed. Specifically, a user requesting VoIP service may already have some or all of the necessary hardware and software, so that provisioning may require only a change in configuration in order to activate VoIP service for that subscriber. Manual intervention may be required, as a departure from more automatic configuration, when CPE 114 is located behind a firewall, or some other protocol or structure, for example.

For the purposes of this disclosure, a subscriber or customer is a telecommunications service user. The telecommunications service can include video (voice and pictures), audio (voice only), or data services over a communications network such as the Internet. In the case of multimedia (voice and pictures) or audio (voice only) services, the video or audio signals must be converted to and from packetized digital messages that are sent and received over the network. A customer typically will pay a subscription fee for access to the selected service. A server is a network resource for supplying and processing information, and can be described as a database server, a file server, or a web server (for use on the World Wide Web). Typically, a web server may be accessed using a web browser.

A configuration server is a network computer system with a memory that stores and selectively disseminates subscriber data used to build a subscriber configuration data file for installation on the customer premises equipment (CPE). Subscriber data can include CPE manufacturer name, CPE manufacturer model number, CPE media access control (MAC) address, CPE serial number, and CPE public encryption key, for example. For use with a voice service provider (VSP), configuration data includes information used to arrange or program some aspect of the CPE or the related network connections, such as a quality of service (QoS), a minimum bandwidth requirement, or latency tolerance, for example.

A provisioning system is one that processes subscriber configuration data and stores the subscriber configuration data on one or more configuration servers. In reference to voice service, a new subscriber is a new voice service customer who has acquired CPE but has not ordered voice service, and a provisioned new subscriber is a new VoIP service customer whose order for VoIP service has been processed, including the assignment of CPE and a VoIP telephone number. The CPE device may be pre-programmed to access only a certain VSP or may be configured at a later time to access one of a number of VSPs. In the case where a particular CPE may access only a certain VSP, the CPE is considered to be VSP-locked, and the user will not usually be able to complete the provisioning process through another VSP other than the pre-programmed VSP. In contrast, if the CPE is not VSP-locked, a user may complete the provisioning process in order to access a selected VSP. One method of completing the provisioning process is accessing a VSP through a world-wide-web (WWW) page, also called a web-portal. In this case, the customer connects through a VSP web-portal to supply information necessary for setting in place and configuring the hardware and software required for voice service.

Depending on the starting point, a customer may follow any one of several scenarios for provisioning VoIP services. Each scenario is also termed a provisioning flow. Following successful provisioning, other requirements may follow regarding management of the VoIP service life-cycle including updating the VoIP configuration and associated software or firmware on a periodic or as-needed basis. Generally, the term software often refers to high-level user-interface (UI) programs that more directly interact with a user, while the term firmware often refers to lower-level instructions executed on a portion of a telecommunications system having little direct user interaction. A modern telecommunications system can include hardware, software, and firmware that must be configured in order to provision VoIP services. Life cycle management can include the periodic or on-demand updating of configuration data, software, and firmware.

Figure 2:
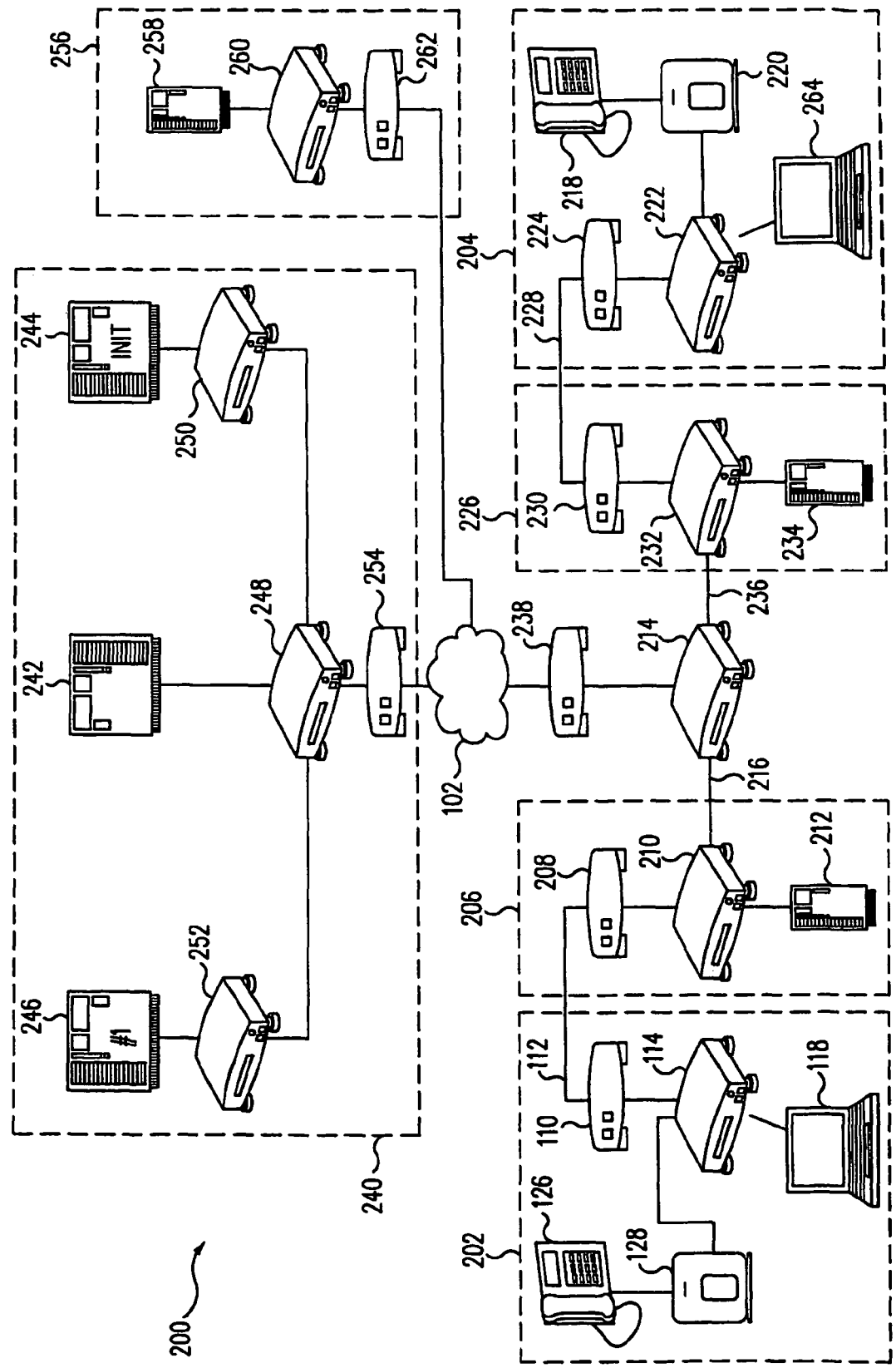
FIG. 2 shows a provisioning system including one form of an end-to-end VoIP network in accordance with an embodiment of the invention.

FIG. 2 shows one embodiment of a provisioning system 200 including one form of an end-to-end VoIP network. Although provisioning system 200 includes only wired connections, it is understood that wireless connectivity may be included as described above. In this limited example, provisioning system 200 includes only a first customer premises 202 and a second customer premises 204, but access is not limited to only two users or two customer sites. As described, first customer premises 202 includes first analog telephone 126 connected to first terminal adapter 128 which connects through first CPE 114 and first modem 110 to a first Internet Service Provider (ISP) 206 through a communication channel 112.

In this case, first ISP 206 also functions as a first voice service provider (VSP) 206 for providing voice connections between local VoIP customers, between at least one customer and a different VSP, or between two different VSPs connected in a hierarchical manner over a network based on switched packed data transfers, such as the internet protocol (IP). First modem 110 and first CPE 114 are configured to allow telecommunications data services from first customer premises 202. First ISP 206 includes a first ISP modem 208 connected to a first ISP router 210 that is connected to a first dynamic host configuration protocol (DHCP) server 212. Using a DHCP server simplifies network management by dynamically assigning an IP address when a network device is added to the network, thus avoiding the need for a manual allocation for this task. In some systems, the IP address can be dynamically changed while the network device is connected. In contrast, a static IP address does not change. Some network devices support a mixture of both dynamic and static IP addressing. Alternatively, modem 208 may be a gateway router that includes a DHCP server 212, or CPE 114 may be connected to an intermediate router (not shown) that provides DHCP services.

In the present configuration, first DHCP server 212 provides a dynamic internet protocol (IP) address to first CPE 114 at customer premises 202. In this illustrative system, first ISP 206 connects to a central router 214 through a communications channel 216. Internet 102 is a broad, hierarchical interconnection network embracing various technologies spanning both the analog and digital domains. A network address translator (NAT) may be used in a hierarchical router or gateway in order to re-map the local network addresses.

Second customer premises 204 includes a second analog telephone 218 connected to a second phone adapter 220 which connects through a second CPE 222 and a second modem 224 to a second Internet Service Provider (ISP) 226 over a communication channel 228. Second ISP 226 also functions as a second voice service provider (VSP) 226 for arranging voice connections between VoIP customers, between at least one customer and a different VSP, or between two different VSPs connected in a hierarchical manner.

Second modem 224 and second CPE 222 are configured to allow telecommunications from second customer premises 204. Second ISP 226 includes a second ISP modem 230 connected to a second ISP router 232 that is connected to a second DHCP server 234 that provides a dynamic internet protocol (IP) address to second CPE 222 at second customer premises 204. Second ISP 226 connects to central router 214 through a communications channel 236. In this manner, first customer premises 202 and second customer premises 204 are connected together in a hierarchical data network. Alternatively, first customer premises 202 and second customer premises 204 may be separated by a great distance, being connected through a diverse interconnection network, or through Internet 102.

A provisioning cluster 240 includes a provisioning server 242, an initialization server 244, and a first configuration server 246 that are used in the provisioning processes to configure and establish telecommunications service between service subscribers. Provisioning server 242 is shown as connected directly to a provisioning router 248, while initialization server 244 is connected to provisioning router 248 through an initialization router 250. Finally, first configuration server 246 is connected to provisioning router 248 through a first configuration router 252. Both initialization server 244 and first configuration server 246 may be located at a great distance from provisioning server 242, and are shown on different sub-networks for illustrative purposes only.

Both initialization server 244 and first configuration server 246 can contain subscriber configuration data for use in the configuration process. In that sense, both initialization server 244 and first configuration server 246 are considered to be configuration servers, with initialization server 244 being accessed first. Although two configuration servers (244, 246) are shown separately, they may be combined into a single initialization server 244 containing the subscriber configuration data. Further, the number of configuration servers is not limited, and may beneficially store user configuration data in a distributed manner for redundancy and fault tolerance as well as to aid in scalability.

For example, configuration data for VoIP subscribers in a particular region may be stored only on configuration servers within that region, so as to avoid network traffic and associated delays caused by accessing a central configuration server, or a configuration server that may be located at an impractically long distance from the subscriber. The components of provisioning cluster 240 may be located at a significant distance from each other, but they cooperate together to provision VoIP services. Provisioning router 248 connects to Internet 102 through a provisioning modem 254. Alternatively, provisioning router 248 can connect directly to central router 214 as a part of a hierarchical digital network. A third voice service provider (VSP) 256 includes a third voice server 258 connected to a third VSP router 260 that connects to Internet 102 through a third VSP modem 262. Third voice server 258 can include DHCP services as well as ISP services. Third VSP 256 arranges voice connections between VoIP customers. Alternatively, third VSP router 260 can connect directly to provisioning router 248 or another router having access to Internet 102.

Although the actual provisioning process of initiating VoIP service will be discussed at below, it is helpful to first consider the operation of a VoIP network. A first user places a VoIP telephone call using analog telephone 126 by entering the unique telephone number of another telephone that can be either a VoIP telephone or a traditional telephone connected through an adapter to the familiar public switched telephone network (PSTN). For illustration, a first user places a call to a second VoIP customer who is subscribed using second analog telephone 218. A voice connection having a reduced latency tolerance must be established between the two analog devices (126, 218) in order to facilitate a normal conversation.

In a traditional data transfer arrangement over Internet 102, latency is not usually an issue since the data from the source is divided into discrete packets that are sent individually and then reassembled at the destination. In this manner, once the data package is reassembled, it does not matter that packets were delayed, nor does it matter that some packets may have been received out of order, as long as the packets are reassembled into their initial order and none are missing. However, in a voice connection, undue latency can cause communication difficulties. To avoid this problem, a priority circuit having a lower latency is typically established between the two ends of the VoIP connection between CPE (114, 222). In a priority case, if a voice packet and a data packet are both received, the voice packet is given priority in order to avoid introducing latency to the voice packet delivery and reassembly.

In this example, first customer premises 202 is subscribed to first VSP 206 that provides for the voice connection between first analog phone 126 and third VSP 256, while second customer premises 204 is subscribed to second VSP 226 that provides for the voice connection between second analog phone 218 and third VSP 256. In this manner, a voice connection between first analog phone 126 and second analog phone 218 can be established through first VSP 206, second VSP 226, and third VSP 256. In this manner, third VSP 256 acts as a regional or global VSP for connecting lower tiered VSPs in a hierarchical manner, even though the VSPs are not directly connected to each other. Alternatively, both first customer premises 202 and second customer premises 204 can be subscribers to any one of the VSPs (206, 226, 256) which can provide the voice connection independently. When the subscribed VSP is not the same as the local ISP for a customer, the subscribed VSP must establish Quality of Service (QoS) agreements with other network providers in regions where they want to provide service, in order to avoid introducing undue latency to the end-to-end voice communication.

Provisioning server 242 provides management of the provisioning flow and directs the storage, retrieval, and processing of provisioning data. Initialization server 244 is a configuration server for storing subscriber and equipment data used as provisioning data during the provisioning process. Similarly, configuration server 246 stores subscriber and equipment data used during provisioning. Initialization server 244 and configuration server 246 can differ in that initialization server 244 is typically contacted first and used for initial provisioning, while configuration server 246 typically stores, retrieves, and manages subscriber configuration data used after initial provisioning has begun.

Alternatively, initialization server 244 and configuration server 246 can be the same server in the sense that all of the configuration data is stored in one place. Initial provisioning flows typically are for a first time connection to the network. Provisioning server 242 processes the service order, updates related network equipment such as a session initiation protocol (SIP) server, and stores subscriber and configuration data in one or more configuration servers (244, 246). In another embodiment, the configuration data needed for provisioning may be distributed across more than one configuration server.

A CPE supplier, such as LINKSYS (R) of Irvine, Calif., USA, can supply CPE devices such as CPE (114, 222, 134, 150, 154), gateway modems (110, 208, 224, 230, 238, 254, 262), terminal adapters (128, 220), and routers (210, 214, 232, 248, 250, 252, 260). A server supplier, such as SUN MICROSYSTEMS (R) of Santa Clara, Calif., USA can supply servers (212, 234, 242, 244, 246, 258). Various service providers may be used to provide a wide range of data, voice, and multimedia services through the Internet 102.

Figure 3:
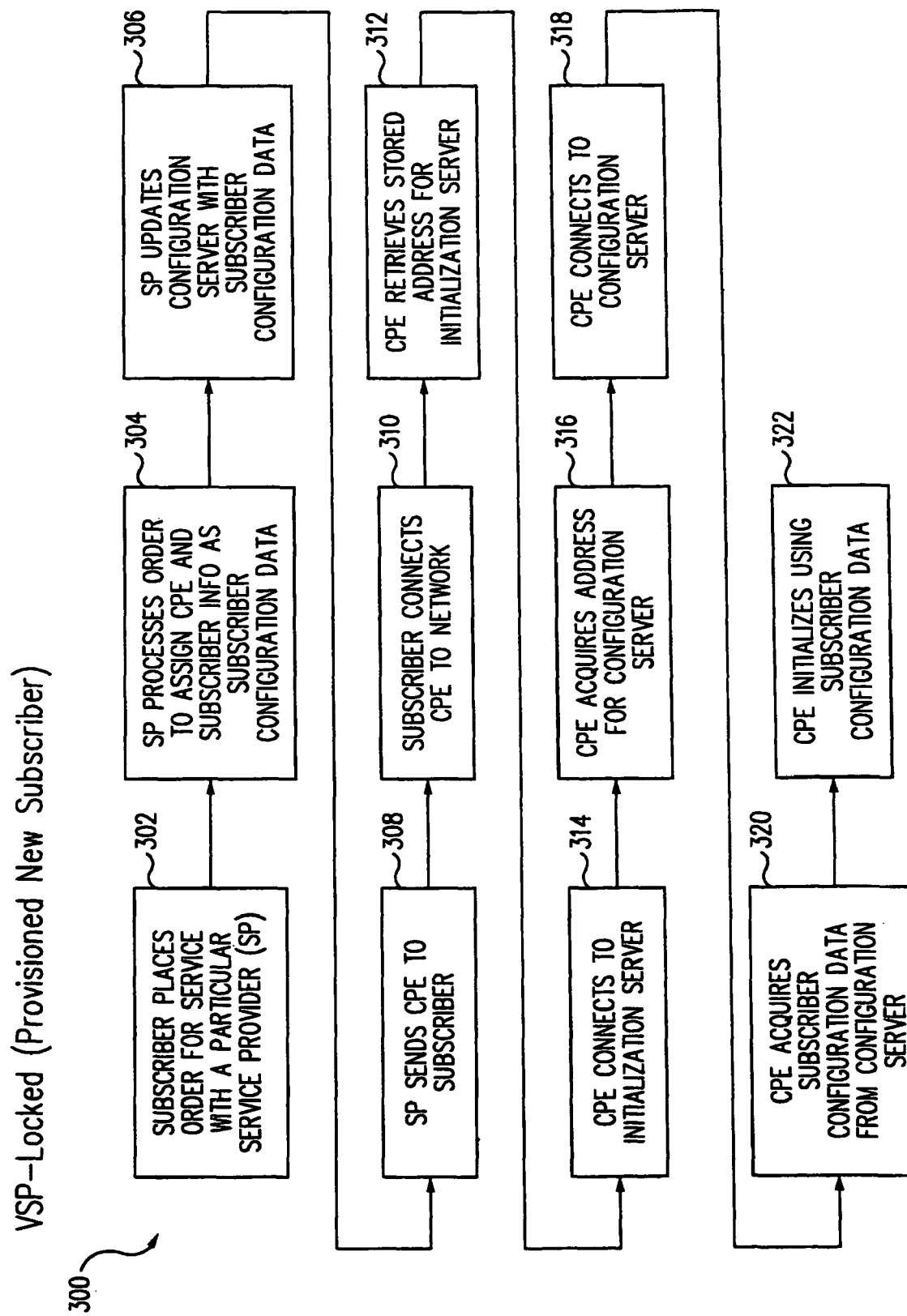
FIG. 3 shows a flow diagram describing a series of operations comprising a provisioning flow for a provisioned new subscriber in accordance with an embodiment of the invention.

According to an embodiment of the present invention, a first scenario for provisioning VoIP services is termed VSP-Locked for a provisioned new subscriber referring to CPE 114 that can only be used with a particular VSP after the subscriber's order for VoIP service has been processed. In this case, flow 300 corresponds to a subscriber starting point where the subscriber does not possess the necessary customer premises equipment (CPE) needed to initiate VoIP services and obtains CPE from the service provider. FIG. 3 shows a flow diagram describing a series of operations comprising a provisioning flow 300 for a provisioned new subscriber. In this embodiment of flow 300, the CPE is sent from a particular VSP to a provisioned subscriber and the subscriber connects CPE 114 to the network after ordering VoIP service. A provisioned new subscriber is a new voice service customer whose order for voice service has been processed, including the assignment of CPE and a VoIP telephone number.

Flow 300 includes a number of operations, including the subscriber placing 302 an order for VoIP service with a voice service provider (VSP). The VSP may be the same as a local internet service provider (ISP), or may be separate. Flow 300 continues with the VSP processing 304 the subscriber order to assign a particular CPE unit 114 to the subscriber and assign subscriber information as subscriber configuration data. The subscriber information assigned by the VSP includes the subscriber VoIP telephone number. The assigned CPE unit information includes a CPE media access control (MAC) address and CPE serial number. The CPE unit is prepared by installing server access information on the CPE including information comprising at least one uniform resource locator (URL) for use on the world wide web (WWW) that identifies the network address of initialization server 244 that is associated with the locked VSP. The installed server access information can be contained within a command script that is executed automatically by CPE unit 114 upon connection to an active network. The URL is a web address for documents or other resources on the WWW.

Flow 300 continues with the operations of updating 306 a configuration server 246 with assigned CPE 114 and subscriber information, and sending 308 the assigned CPE 114 device to the subscriber. The assigned CPE 114 can be shipped directly or through an intermediary to the subscriber. Alternative delivery methods are possible. Within flow 300, the VSP causes a particular CPE 114 to be pre-stored with the URL of the locked VSP and then sent to the subscriber. Alternatively, the VSP may select a pre-programmed CPE device to send to the subscriber. In this manner, the VSP is already in possession of the unique information that identifies CPE 114. Once the assigned CPE 114 is received by the subscriber, flow 300 continues with the subscriber connecting 310 assigned CPE 114 to an active network with access to Internet 102. Once connected to an active network, CPE 114 is assigned an IP address from DHCP server 212. Flow 300 continues with CPE 114 retrieving 312 the pre-stored VSP network address, or URL, for initialization server 244. Flow 300 further includes connecting 314 to initialization server 244 and acquiring 316 a URL for configuration server 246.

Flow 300 proceeds with the CPE connecting 318 to configuration server 246 and acquiring 320 the configuration data. Finally, flow 300 concludes with initializing 322 the CPE using the acquired configuration data to complete VoIP provisioning for a provisioned new subscriber. As an alternative, the initialization server 244 may be the same as the configuration server 246, so a separate operation of connecting 318 to the configuration server 246 may be omitted in that case. More specifically, in one alternative, the subscriber configuration data is supplied directly by the initialization server 244, or the initialization server 244 supplies a URL that identifies the initialization server 244 as the configuration server 246.

Figure 4:
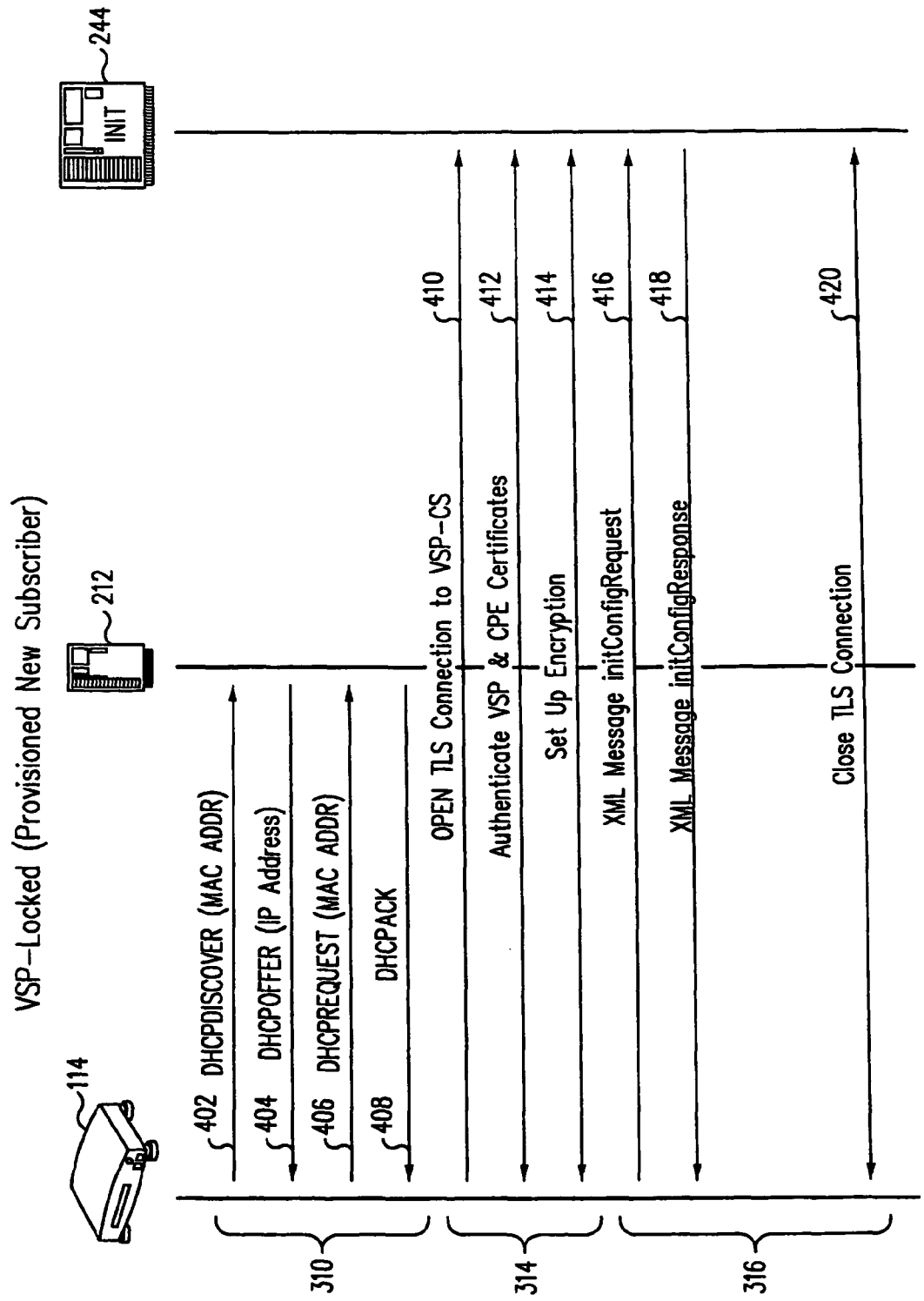
FIG. 4 shows a high-level flow diagram describing the interactions between a customer premises equipment (CPE), a dynamic host configuration protocol (DHCP) server, and an initialization server in accordance with an embodiment of the invention.

FIG. 4 shows a high-level flow diagram describing the interactions between CPE 114, DHCP server 212, and initialization server 244. According to flow 300, the operation of connecting 310 CPE 114 to the network is illustrated in more detail. Once a network device, such as CPE 114, is physically connected to the network, the device must be functionally connected to the network by assigning a unique IP address to the newly connected device. Typically, the assignment of an available IP address can be done dynamically by the DHCP server 212 once the device is physically connected to an active network. Once the newly connected CPE 114 device detects it is connected to an active network, CPE 114 broadcasts a DHCPDISCOVER message 402 where CPE 114 asserts a MAC address to the active network in order to locate available servers.

DHCP server 212 receives the DCHPDISCOVER message 402 and responds to the broadcast by asserting a DHCPOFFER message 404 to CPE 114 including parameters of a proposed network address. CPE 114 responds to DHCPOFFER with a DHCPREQUEST message 406 requesting the offered parameters from DHCP server 212 and implicitly declining offers from all other servers that may have responded to the DHCPDISCOVER message 402. DHCP server 212 then responds with a DHCPACK message 408 including the committed network address to conclude the operation of physically and functionally connecting 310 CPE 114 to the network. Once CPE 114 is functionally connected to the active network, operation 312 includes retrieving a stored VSP URL that identifies initialization server 244.

Since protecting customer information and configuration details is desirable to avoid unnecessarily exposing individuals to identity theft and networks from compromise, network security is important. Hence, it is desirable to establish a secure connection, or encrypted communication channel, prior to the exchange of sensitive information over an unsecured network such as Internet 102. One way to accomplish this is to establish a transport layer security (TLS) channel between two devices prior to exchanging sensitive information.

The transport layer security framework is specified according to an Internet Engineering Task Force (IETF) TLS Working Group document RFC2246 which specifies the transport layer security protocol. The transport layer refers to the middle layer of a networking framework called the open system interconnection (OSI) model and provides for transparent transfer of data between end systems or hosts. The transport layer of OSI is responsible for end-to-end error recovery and flow control to ensure complete data transfer. In establishing a traditional TLS connection, a secure connection is formed by passing encrypted information messages that are decrypted by each entity in order to mutually authenticate each entity to the other entity. Ordinary mutual authentication is typically not specific to a particular device or server, but merely verifies that each entity is in possession of a valid, encrypted certificate. Essentially, the traditional form of mutual authentication only verifies that each entity belongs to a group of approved entities, and unique information that identifies a particular CPE 114 is not used.

Once the above mutual authentication is completed, the entities traditionally proceed to set up encryption, to establish a secure connection by changing the cipher specification. This takes time which limits server availability, and can result in needlessly transferring information between the entities in the event that either entity is later deemed to be invalid due to more detailed considerations. For example, even if the traditionally authenticated CPE device is in possession of a valid, generic certificate issued by the CPE manufacturer, the CPE device may not be assigned to a valid subscriber or listed in an approved database of valid CPE devices.

One way to avoid this issue of occupying the server and setting up encryption with an unwanted device is for the server to perform a more detailed authentication on the CPE device first, and only proceed with setting up encryption when the CPE device is also approved. For example, the CPE device certificate can include unique information identifying the particular CPE device, as opposed to a generic certificate supplied by the CPE manufacturer, that identifies the CPE device as being manufactured by the certified manufacturer. Such extended information can be utilized during the establishment of a TLS connection if optional TLS functions are used, such as described in an extension to TLS called X.509 is used as described in IETF document RFC2459.

If the server decrypts the CPE certificate and finds the CPE device is not approved, then the TLS negotiation can be terminated before engaging in the change cipher specification process to set up encryption. To facilitate the unique identification of devices, a CPE supplier can also issue security information associated with a particular device such as a device-specific CPE private cryptographic key and a server public cryptographic key for server authentication. Due to the open nature of an Internet 102 or IP protocol based network, use of encryption is desirable, and a public/private, asymmetric encryption and decryption system can be ideally suited. Once the secure TLS is established, configuration and customer data may be safely exchanged.

Operation 314, where CPE 114 uses the retrieved VSP URL in order to connect to initialization server 244, includes opening 410 a transport layer security (TLS) connection to the VSP initialization server 244, mutually authenticating 412 both VSP and CPE certificates, and setting up TLS session encryption 414 to establish the TLS connection. Once the TLS connection is established, operation 316 begins where CPE 114 acquires the network address for configuration server 246.

In one embodiment, CPE 114 sends an XML format message initConfigRequest 416 to request a configuration message from initialization server 244 which then responds by sending an XML format message initConfigResponse 418 containing the network address URL for configuration server 246. After this, the TLS session with initialization server 244 is concluded with a closing 420 of the TLS connection. Alternatively, initConfigResponse 418 can contain more than one URL. In one embodiment, the plurality of URLs can be used to reference different data that is chained together to make one subscriber configuration data file. In another embodiment, the plurality of URLs can be used to reference the same data on different servers to provide redundancy protection if one or more of the referenced servers is not available.

Figure 5:
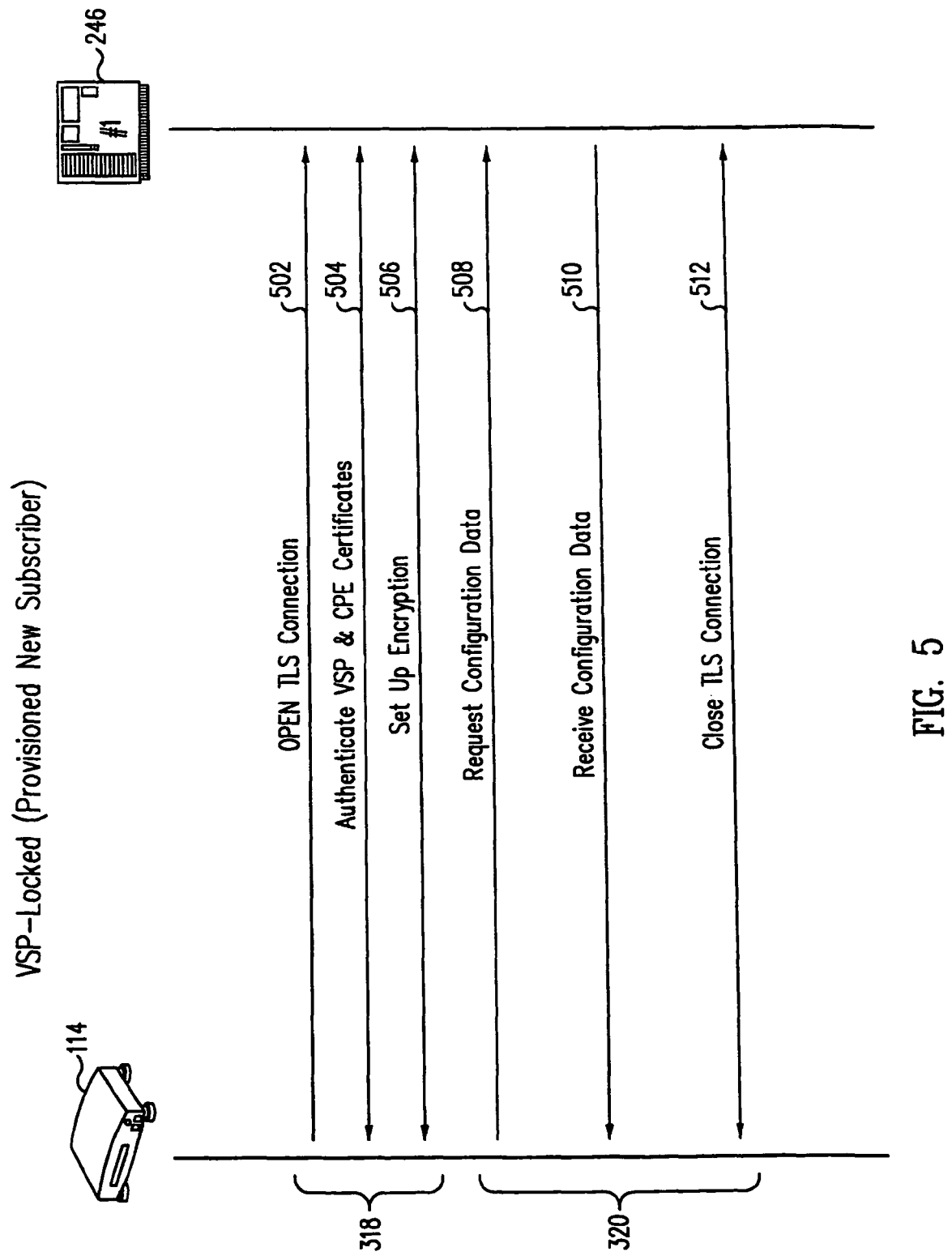
FIG. 5 shows a high-level flow diagram describing exemplary interactions between a CPE and a configuration server in accordance with an embodiment of the invention.

FIG. 5 shows a high-level flow diagram describing exemplary interactions between CPE 114 and configuration server 246. Operation 318, where CPE 114 connects to configuration server 246, includes opening 502 a TLS connection, mutually authenticating 504 both VSP and CPE certificates, and setting up encryption 506 using the change cipher specification which establishes the secure connection between CPE 114 and configuration server 246. Operation 320, where CPE acquires configuration data from configuration server 246, includes CPE 114 sending 508 a request configuration data message, receiving 510 a configuration data message including subscriber configuration data for CPE 114, and closing 512 the TLS connection.

The subscriber configuration data is not limited to the content of one configuration data message, but may incorporate information from more than one configuration data message from the same or different configuration servers. Once CPE 114 receives the subscriber configuration data from configuration server 246, operation 322 begins where CPE is initialized using the configuration data to establish the service, in this case a VoIP capability, and flow 300 for a VSP-Locked provisioned new subscriber is concluded.

Figure 6:
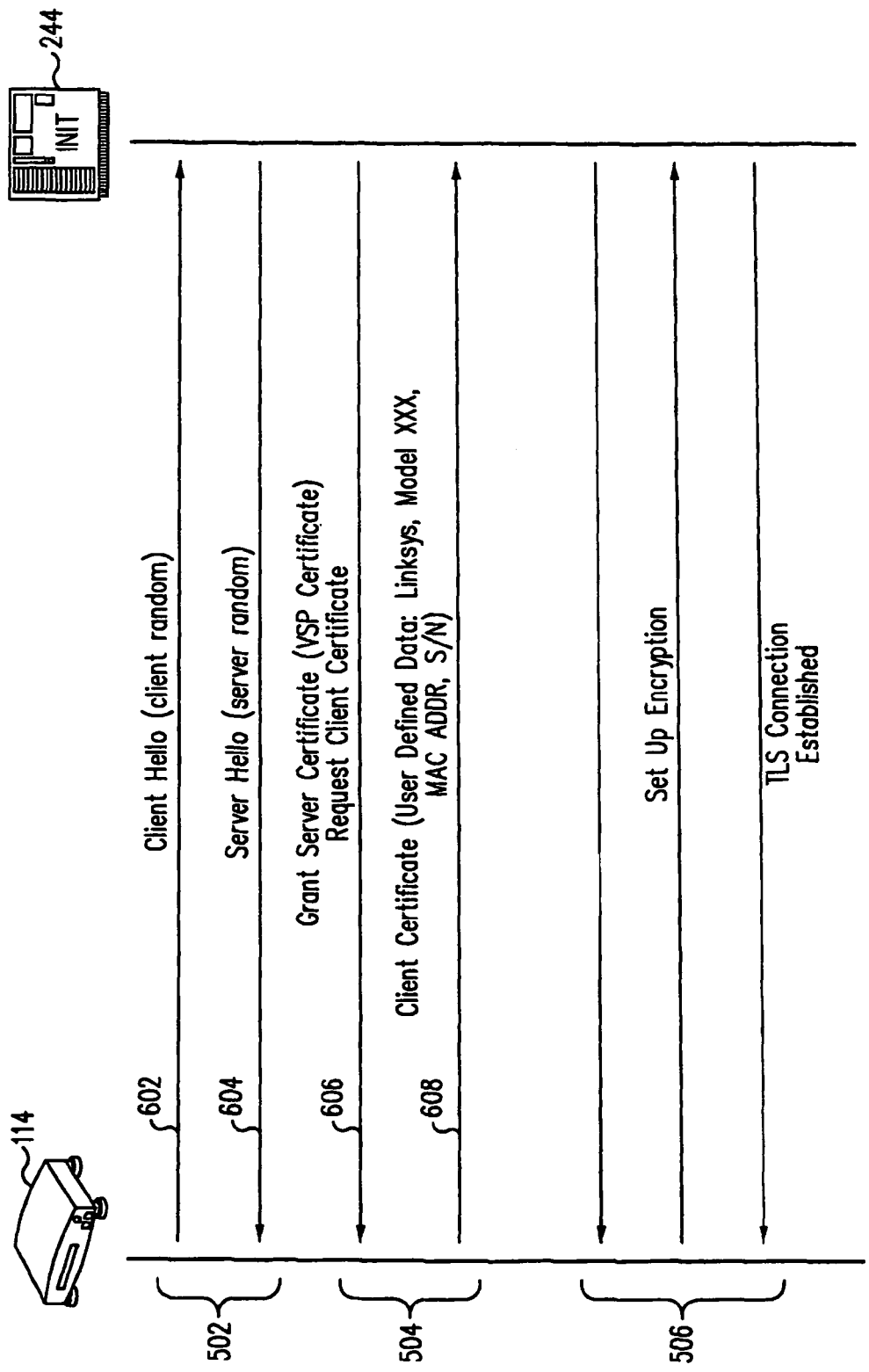
FIG. 6 shows an exemplary transaction diagram for a portion of the procedure to establishing a transport layer security (TLS) connection between a CPE and an initialization server in accordance with an embodiment of the invention.

FIG. 6 shows an exemplary transaction diagram for a portion of the procedure to establishing a transport layer security (TLS) connection between CPE 114 and initialization server 244, for example, prior to exchanging sensitive customer and configuration data. CPE 114 initiates the TLS process by sending 602 a client hello message to initialization server 244, which answers 604 client hello message 602 with a corresponding server hello message, corresponding to opening 502 a TLS connection. CPE 114 stores a CPE private key and an initialization server public key. Conversely, initialization server 244 stores a CPE public key and an initialization server private key.

Following the sending 604 of server hello message, initialization server 244 sends 606 a grant VSP server certificate message granting the initialization server VSP certificate and requesting the CPE 114 client certificate. The VSP certificate is already encrypted using the initialization server 244 private key. CPE 114 decrypts the VSP server certificate with the initialization server public key and checks the identity of the organization that issued the VSP certificate. If the VSP certificate issuer is not approved, the TLS procedure is abandoned.

The VSP certificate issuer may not be approved if the issuer is not an approved vendor or if an authentication problem prevents the authentication process from completing normally. However, if the VSP certificate issuer is approved, CPE 114 sends the encrypted CPE certificate and user defined data using the CPE private key and sends the encrypted CPE certificate along with user defined data in a client certificate message 608. At this point, provisioning server 242 authenticates the CPE certificate by decrypting it using the CPE public key and verifying the issuer is approved.

If the issuer is not approved, the TLS procedure is abandoned. However, if the issuer is approved, provisioning server 242 proceeds to matching the decrypted CPE data with the CPE data records previously stored in a CPE database. If there is a match found in the CPE database, provisioning server 242 determines if VSP service has been approved for this CPE unit. If VSP service has not been approved, the TLS procedure is abandoned. However, if the VSP service has been approved, the TLS procedure continues to set up the session encryption using a change cipher specification protocol 610. Message 606 and message 608 correspond to mutually authenticating 504 both VSP and CPE certificates. Once the cipher specification is changed, corresponding to setting up encryption 506, the TLS connection is established providing security for the completion of a provisioning flow, as described below.

The first scenario described above applies to a provisioned new subscriber where the VSP sends CPE 114 equipment to the subscriber after placing an order. Alternatively, the subscriber may acquire a CPE unit from another source, such as a retail store, and then a modified flow includes placing 302 an order for VoIP services, VSP processing 304 the placed order, and VSP updating 306 configuration sever (244, 246) with subscriber data. After this, flow 300 resumes at operation 310, with the subscriber connecting 310 the newly acquired CPE unit to the network. In this alternative, after acquiring an unassigned CPE unit, the subscriber provides CPE information at the time of ordering VoIP service. The CPE information can include a CPE serial number, a MAC address, and a CPE public key, for example. As a practical matter, the user may not be aware of any secure communication artifacts, and the CPE public key itself may not be communicated to the VSP at the time of ordering, but rather an abbreviated handle may be used that can uniquely identify the public key and supplied during the ordering process. Alternatively, the CPE device maker and serial number may be used by the VSP to acquire the CPE public key through other means.

Figure 7:
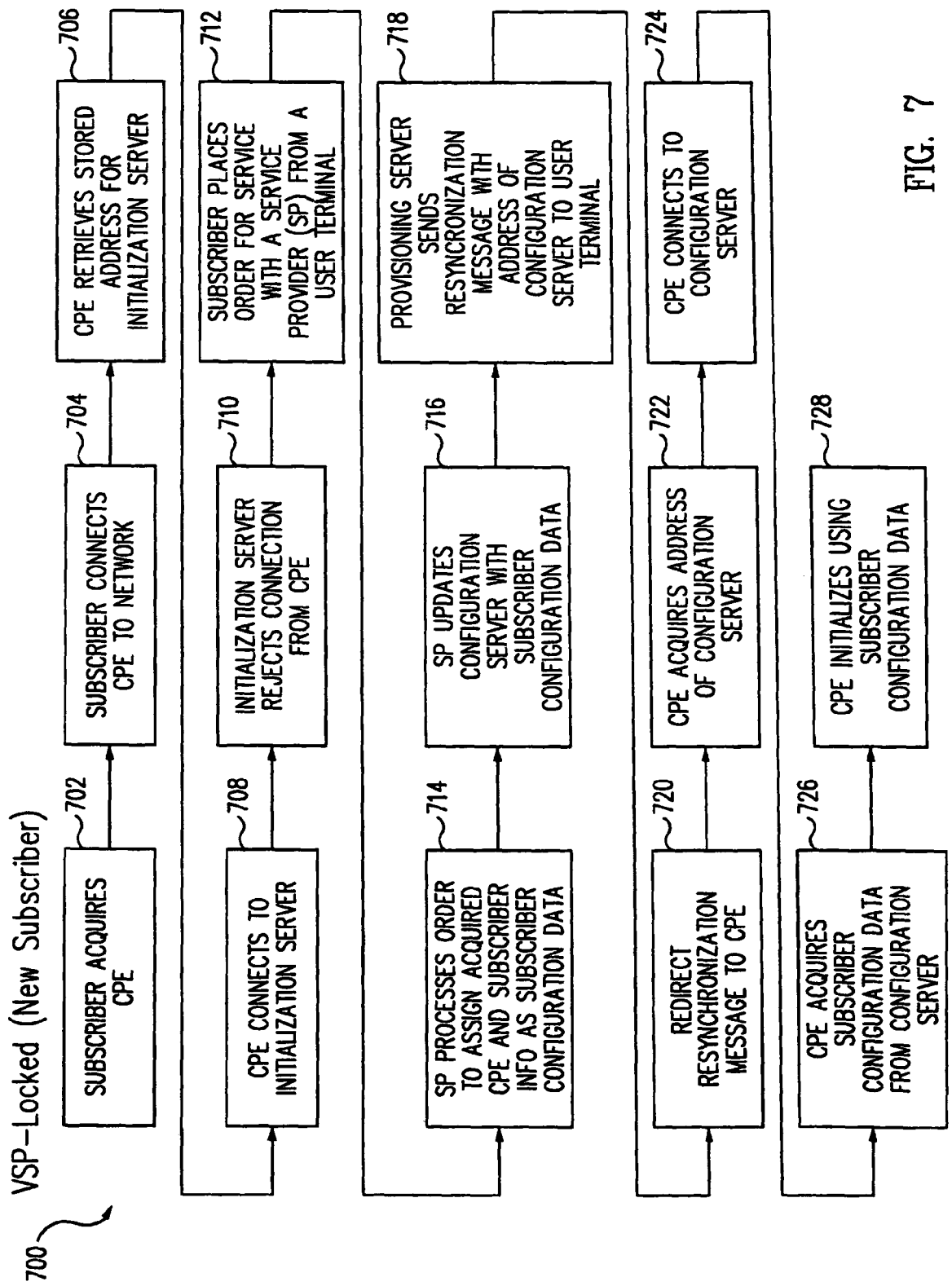
FIG. 7 shows a flow diagram describing a series of operations comprising a provisioning flow for a VSP-Locked new subscriber new subscriber in accordance with an embodiment of the invention.

According to an embodiment of the present invention, a second scenario for provisioning VoIP services is termed VSP-Locked for a new subscriber. FIG. 7 shows a flow diagram describing a series of operations comprising a provisioning flow 700 for a VSP-Locked new subscriber referring to a CPE unit that can only be used with a particular VSP where the subscriber connects the CPE unit to the network before ordering VoIP service. A new subscriber is a new voice service customer whose order for voice service has not been processed, meaning the assignment of CPE and VoIP telephone number has not yet begun. In this manner, a subscriber may have acquired CPE that is capable of accessing one or more services, yet this capability is not yet activated.

Flow 700 includes a number of operations, beginning with the subscriber acquiring 702 a CPE unit. The subscriber may acquire CPE 114 by purchase at a retail store, an online supplier, or other means. CPE 114 is prepared by installing access information including at least one uniform resource locator (URL) identifying the network address of initialization server 244 associated with the locked VSP. Although CPE 114 is aware of initialization server 244, since the subscriber has not yet placed an order for VoIP service, initialization server 244 cannot recognize the subscriber as a valid.

Once the subscriber has acquired CPE 114, flow 700 continues with operation of connecting 704 acquired CPE 114 to an active network with access to Internet 102. Once CPE 114 is connected to the active network, it executes an internal script retrieving 706 the URL for initialization server 244. Flow 700 continues with CPE 114 connecting 708 to initialization server 244, as discussed above. However, since the subscriber has not yet placed an order for VoIP services, the specific CPE 114 will not be listed in an approved database of registered subscribers. Flow 700 continues with initialization server 244 rejecting 710 the connection from CPE 114. In one embodiment, a user will be provided with an audible notice that initialization server 244 has rejected the connection from CPE 114, or that an error occurred during processing, by the absence of a dial-tone in the VoIP telephone.

Once the subscriber receives notice that the attempted connection from CPE 114 to initialization server 244 was rejected, flow 700 continues with the subscriber placing 712 an order for VoIP server with the VSP identified as associated with CPE 114 from a user terminal, such as a web-browser running on first computer 118. The subscriber supplies CPE 114 information during the order so that VSP can uniquely identify the CPE 114 as a valid device associated with the new subscriber.

Several benefits follow from preparing CPE 114 by pre-storing a URL for connecting to a predetermined initialization server 244. First, the VSP maintains control of the provisioning process since CPE 114 is configured for use with only a particular VSP which can be helpful in automating the provisioning process by eliminating options. Second, the CPE unit may be offered at a reduced price as an incentive to encourage subscribers to a particular VSP, and some of the actual cost of CPE 114 may be rolled in with a periodic service rate plan. Third, a subscriber can be confident their acquired CPE 114 will work with the intended VSP since CPE 114 is supplied directly or indirectly by the intended VSP. Flow 700 continues with the VSP processing 714 the subscriber order to assign the acquired CPE 114 and subscriber information as subscriber configuration data, and updating 716 configuration servers (244, 246) with the subscriber configuration data.

Once the configuration servers (244, 246) are updated, flow 700 continues with provisioning server 242 sending 718 a resynchronization message including a URL for configuration server 246 to first computer 118. The resynchronization message is sent to first computer 118 but is intended for CPE 114. Since the resynchronization message was sent to first computer 118, which was not the intended target, the resynchronization message includes an embedded internet protocol (IP) address used to find the terminal device for voice service, CPE 114, on the local area network (LAN) associated with first computer 118.

The flow 700 continues with redirecting 720 the resynchronization message from first computer 118 to CPE 114, the intended user of the subscriber configuration data. Flow 700 continues with the CPE 114 acquiring 722 a URL for configuration server 246. In flow 700, CPE 114 acquires the URL for configuration server 246 by extracting the URL from the resynchronization message. Flow 700 continues by CPE connecting 724 to configuration server 246 and acquiring 726 the configuration data. Flow 700 concludes with initializing 728 the CPE 114 using the acquired subscriber configuration data to complete VoIP provisioning for a VSP-Locked new subscriber.

Figure 8:
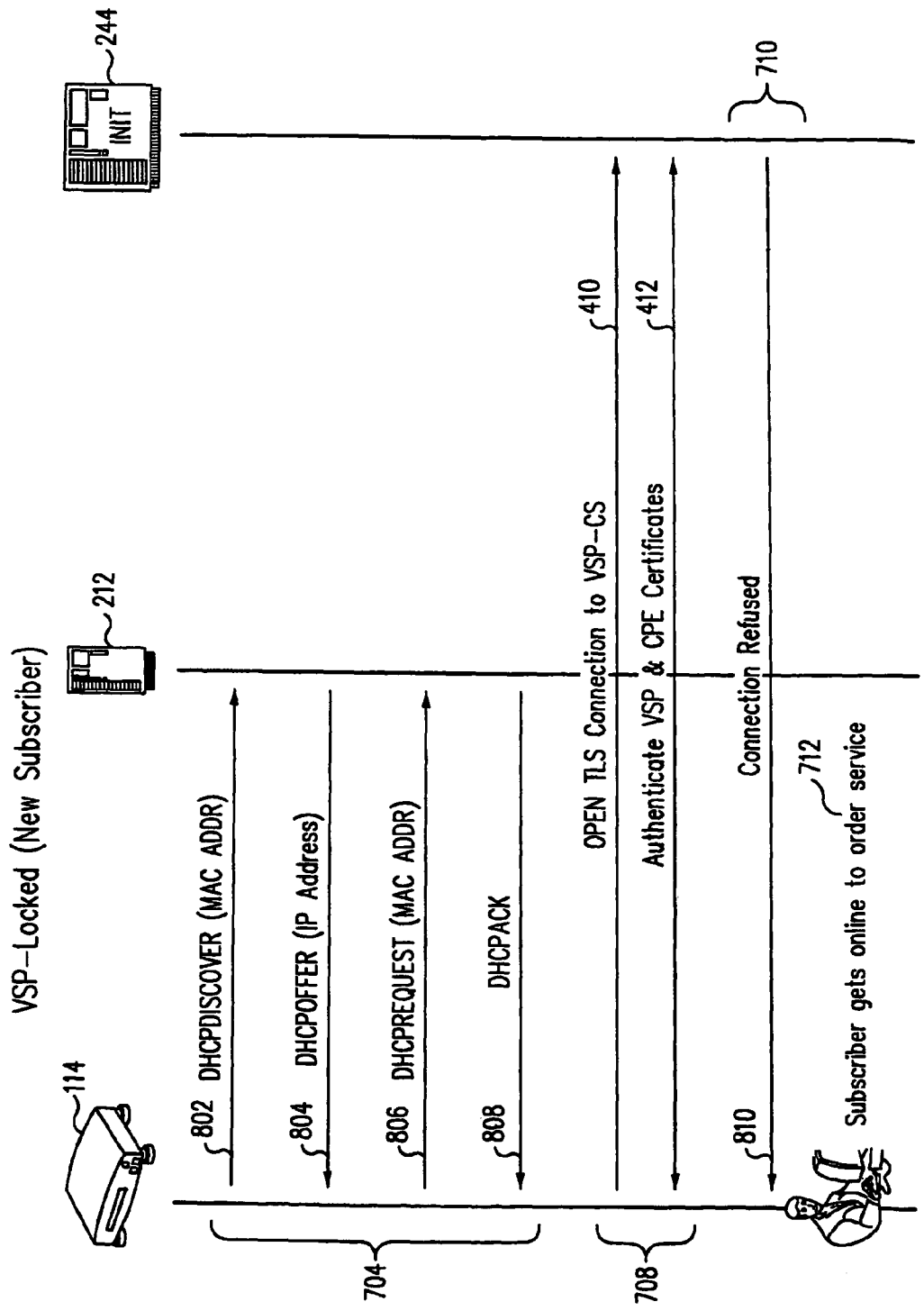
FIG. 8 shows another exemplary transaction diagram for a portion of the procedure to establishing a transport layer security (TLS) connection between a CPE and an initialization server in accordance with an embodiment of the invention.

FIG. 8 shows an exemplary transaction diagram for a portion of the procedure to establishing a transport layer security (TLS) connection between a CPE 114 and initialization server 244, for example, prior to exchanging customer and configuration data. According to flow 700, the operation of connecting 704 CPE 114 to the network is illustrated in more detail. Similar in some ways to operation 310, CPE 114 broadcasts 802 a DHCPDISCOVER message where CPE 114 asserts a MAC address to the active network in order to locate available servers. DHCP server 212 receives the DCHPDISCOVER message and responds to the broadcast by asserting 804 a DHCPOFFER message to CPE 114 including parameters of a proposed network address. CPE 114 responds to the DHCPOFFER by sending 806 a DHCPREQUEST message requesting the offered parameters from DHCP server 212 and implicitly declining offers from all other servers that may have responded to the DHCPDISCOVER message. DHCP server 212 then responds by asserting 808 a DHCPACK message including the committed network address to conclude the operation of connecting 704 CPE 114 to the network. Once CPE 114 is operatively connected to the active network, operation 706 includes retrieving a stored VSP URL identifying initialization server 244.

Operation 708, where CPE 114 uses the retrieved VSP URL in order to connect to initialization server 244, includes opening 410 a Transport Layer Security (TLS) connection to the VSP initialization server 244 and mutually authenticating 412 both VSP and CPE certificates. Since the subscriber data is not in the VSP database, the extended authentication describe above will fail, and flow 700 continues with initialization server 244 rejecting 810 the connection from CPE 114 by sending a connection refused message. The connection refused message can include a URL for provisioning server 242. Alternatively, the URL for provisioning server 242 may be listed on CPE 114, or in documentation associated with CPE 114, to enable a subscriber to access provisioning server 242 after access to initialization server 244 is rejected. A subscriber could access provisioning server 242 by manually typing in the supplied URL, by navigating a CPE supplier web-site, or by using a WWW search engine.

Figure 9:
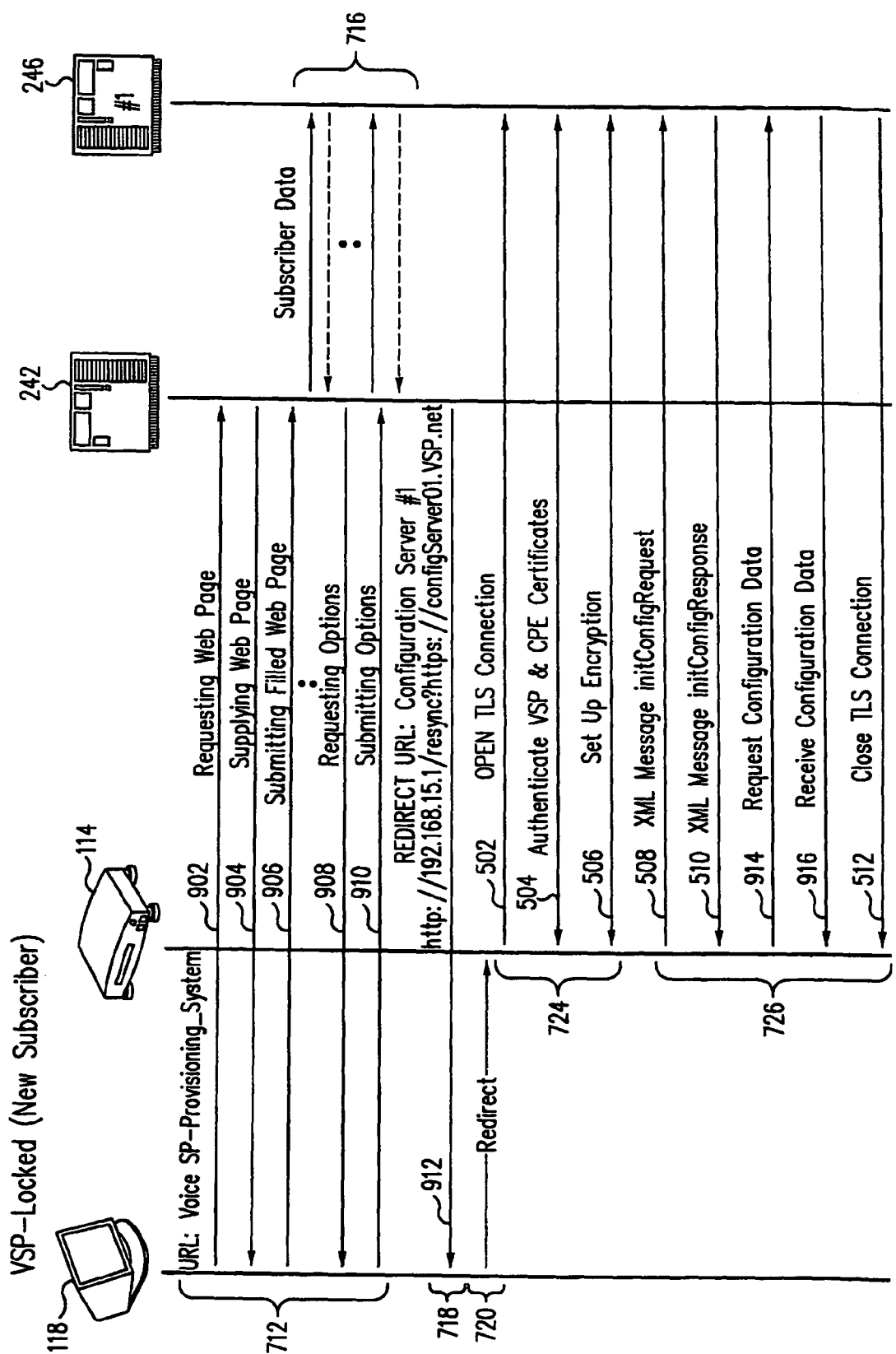
FIG. 9 shows an exemplary transaction diagram for a portion of the procedure to establish VoIP services following rejection of a connection with an initialization server in accordance with an embodiment of the invention.

FIG. 9 shows an exemplary transaction diagram for a portion of the procedure to establish VoIP services for a router/CPE 114 following rejection of the connection with initialization server 244. Once the initialization server 244 rejects the connection from an unregistered CPE 114, the subscriber receives the connection refused message and flow 700 continues with the operation 712 for ordering VoIP services from first computer 118 which resides on the same local area network (LAN) as CPE 114. Typically, the subscriber accesses the provisioning server through a web-browser user interface running on first computer 118, or some other computer on the same LAN as CPE 114. The subscriber interacts with provisioning server 242 through the web-based ordering process in order to convey the appropriate information regarding identification of the subscriber and the acquired CPE 114 comprising the subscriber data.

According to FIG. 9, this interaction beings with the operations of requesting 902 a web page from provisional server 242 and supplying 904 the requested web page to the subscriber at the user terminal first computer 118. The supplied web page includes at least one user data field to be filled by the subscriber with identifying data. The interaction continues with submitting 906 a completed web page, the provisioning server 242 requesting options, if any based on the processing of the filled user data field. If an option was requested, or if the previously submitted response must be confirmed, the interaction concludes with submitting 910 options to provisioning server 242. Even before the interaction described in operations 902-910 is completed, flow 700 can continue with operation 716 of updating configuration server 246 with the subscriber configuration data. Alternatively, operation 716 may wait until all responses from the subscriber are processed.

Once configuration server 246 is updated, flow 700 continues with provisioning server 242 sending 912 a resynchronization message including a URL for configuration server 246 intended for CPE 114 but sent to first computer 118 since the IP address of the subscriber on first computer 118 is used in communicating with provisioning server 242. In this example, the resynchronization message is built by the provisioning server based on information supplied by the user, and depends on which terminal device is used for the established service. In this case, router/CPE 114 is the terminal device for establishing the voice service, so the resynchronization message sent to the browser running on terminal 118 explicitly includes a redirection to the router 114 associated with the LAN by virtue of the IP address 192.168.15.1 which is the router address as seen by terminal 118.

Once terminal 118 receives the resynchronization message including the router address, flow 700 continues with redirecting 720 the resynchronization message to CPE 114 on the local area network associated with first computer 118, followed by CPE 114 acquiring 722 the URL for configuration server 246 from the resynchronization message. Alternatively, if the terminal device is a telephone adapter 128, provisioning server 242 will be aware of this when the terminal device information is acquired during the request for service by the subscriber, and the IP address of telephone adapter 128 can be manually entered. Provisioning server 242 can then build a redirect message that includes the IP address of the telephone adapter 128 so that after the resynchronization message is sent to the browser running on terminal 118, the resynchronization message will be redirected to the telephone adapter 128 IP address specified in the resynchronization message.

Once the network address of configuration server 246 is known, flow 700 continues with CPE 114 connecting 724 to configuration server 246 by opening 502 a TLS connection to the configuration server 246 specified in the resynchronization message, mutually authenticating 504 both VSP and CPE certificates, and setting up encryption 506 which establishes the secure connection between CPE 114 and configuration server 246. Mutual authentication succeeds in this case since provisioning server 242 has updated configuration server 246 with subscriber configuration data corresponding to CPE 114. After mutual authentication, the session encryption is established as a part of the TLS protocol, as discussed in reference to FIG. 5.

Once the secure TLS connection is established, flow 700 continues with CPE 114 acquiring 726 configuration data from configuration server 246 by sending 508 a request configuration data message and receiving 510 a receive configuration data message including configuration data for CPE 114. However, in cases of receiving configuration information from initialization server 244 or configuration server 246, it is possible to receive more than one URL indicating the desired configuration data is distributed in more than one location either on the same or a different configuration server 246. In this case, operation 726 further includes sending 914 a request configuration data message to the same or different configuration server 246, and receiving 916 a receive configuration data message. Once all configuration data is requested and received, operation 726 concludes with closing 512 the TLS connection. Once all of the configuration data is assembled from one or more sources, flow 700 continues with CPE 114 initializing 728 using the received and assembled subscriber configuration data.

Figure 10:
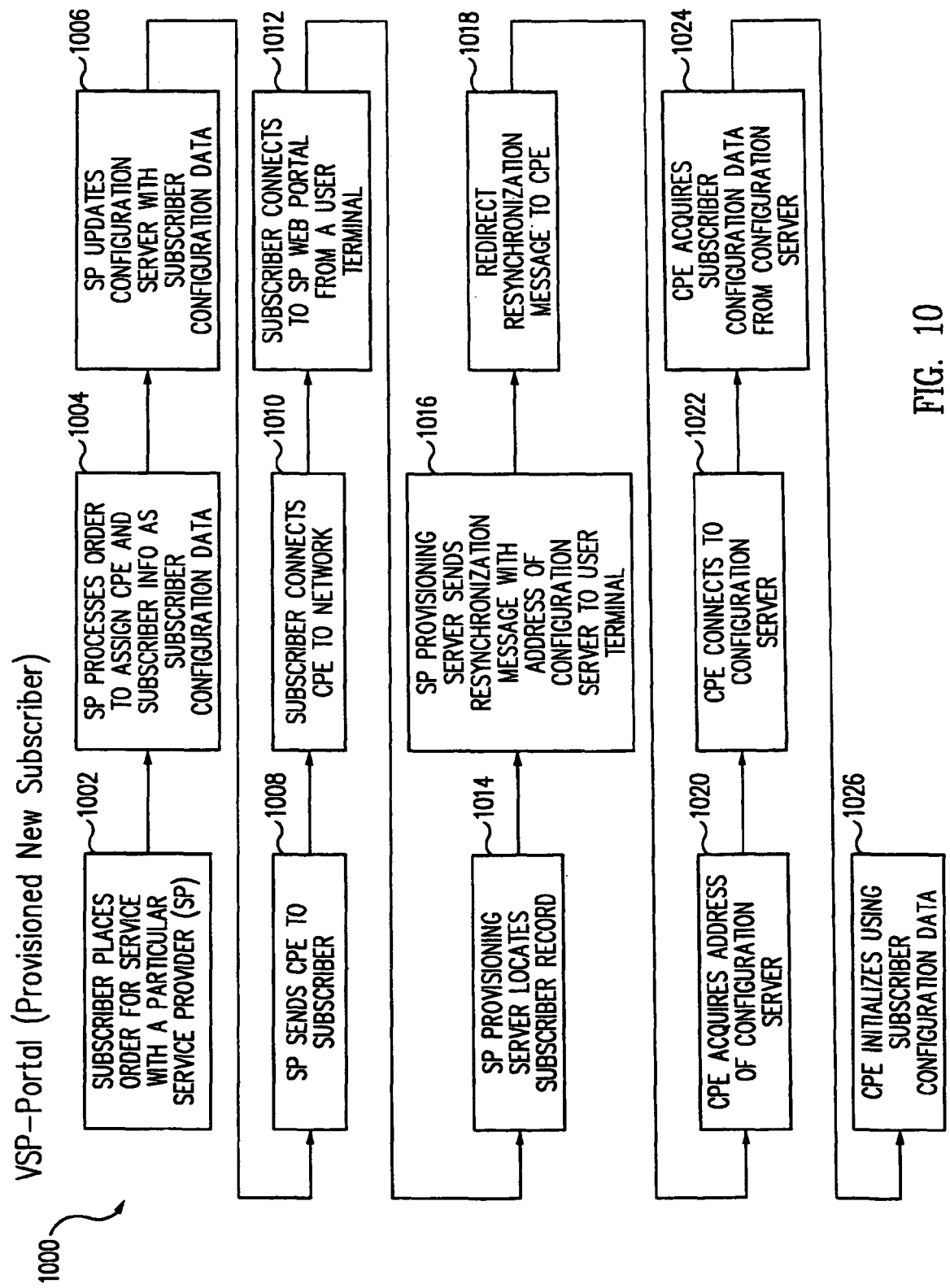
FIG. 10 shows a flow diagram describing a series of operations comprising a provisioning flow for a VSP-portal provisioned new subscriber in accordance with an embodiment of the invention.

According to an embodiment of the present invention, a third scenario for provisioning VoIP services is termed VSP-Portal for a provisioned new subscriber. FIG. 10 shows a flow diagram describing a series of operations comprising a provisioning flow 1000 for a VSP-portal provisioned new subscriber where the CPE is sent from a particular VSP to a provisioned subscriber. Flow 1000 includes a number of operations, including the subscriber placing 1002 an order for VoIP service with a voice service provider (VSP). The VSP may be the same as a local internet service provider (ISP), or may be separate.

Flow 1000 further includes the VSP processing 1004 the subscriber order to assign a particular CPE device to the subscriber and assign subscriber information as subscriber configuration data. Contrary to flow 300, CPE 114 in flow 1000 is not prepared by installing access information for a particular VSP. In this manner, CPE 114 may contain unique data in the form of one or more unique CPE certificate, as discussed above, but may not be locked to service with a particular VSP. A ring of CPE certificates may reside within CPE 114 and be used in order to access one or more initialization servers, for example.

Flow 1000 further includes the operations of updating 1006 a configuration server 246 with assigned CPE 114 and subscriber data, and sending 1008 the assigned CPE 114 unit to the subscriber. The assigned CPE 114 is sent directly or through an intermediary to the subscriber. Alternatively, the VSP may select a pre-programmed CPE device to send to the subscriber. Once the assigned CPE 114 is received by the subscriber, flow 1000 continues with the subscriber connecting 1010 assigned CPE 114 to an active network with access to Internet 102. Once connected to the active network, CPE 114 receives an IP address from DHCP server 212, as described above. Flow 1000 continues with the subscriber connecting 1012 to a VSP web portal from user terminal, such as first computer 118.

Typically, the subscriber connection is made using a web-browser user interface running on first computer 118. The subscriber enters identifying information to indicate the subscriber is a valid customer and flow 1000 continues with provisioning server 242 locating 1014 a subscriber record corresponding to the subscriber entered identifying information. Once the subscriber record is located, flow 1000 continues with the provisioning server 242 sending 1016 resynchronization message including a URL for configuration server 246 to first computer 118. Although the resynchronization message is sent to first computer 118, it is intended for CPE 114, as described above. Receipt of the resynchronization message by first computer 118 initiates a port scan or other network technique to find CPE 114 on the local area network associated with first computer 118. The flow 1000 continues with redirecting 1018 the resynchronization message from first computer 118 to CPE 114.

Flow 1000 continues with the CPE 114 acquiring 1020 a URL for configuration server 246. In flow 1000, CPE 114 acquires the URL for configuration server 246 by extracting the URL from the resynchronization message. Flow 1000 continues by CPE 114 connecting 1022 to configuration server 246 and acquiring 1024 the configuration data. Flow 1000 concludes with initializing 1026 the CPE 114 using the acquired configuration data to complete VoIP provisioning for a VSP-portal provisioned new subscriber.

Figure 11:
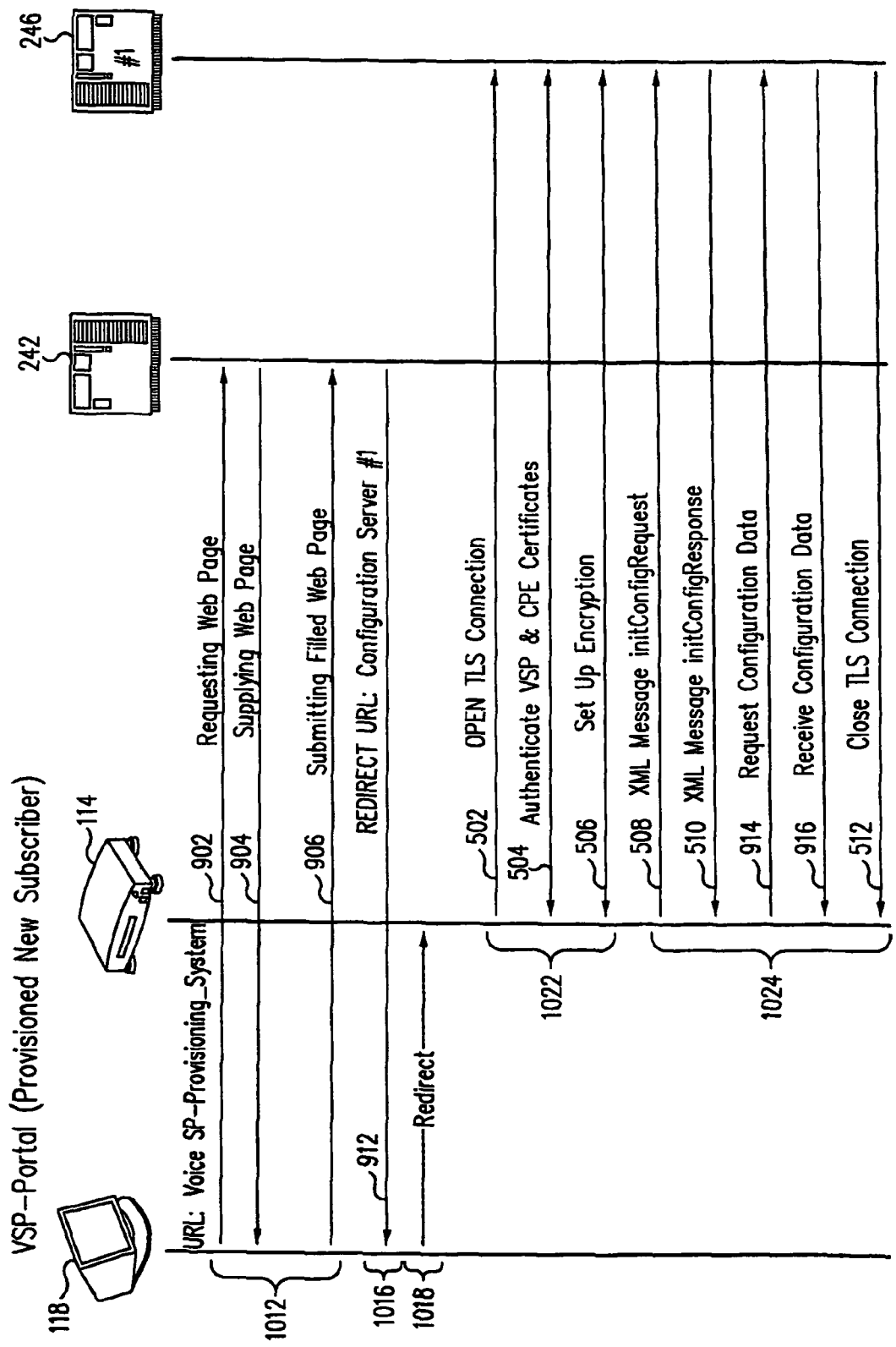
FIG. 11 shows an exemplary transaction diagram for a portion of a provisioning flow following the operation of connecting the assigned CPE to an active network in accordance with an embodiment of the invention.

FIG. 11 shows an exemplary transaction diagram for a portion of flow 1000 following the operation of connecting 1010 the assigned CPE 114 to an active network. Flow 1000 continues with the subscriber accessing 1012 a VSP web portal from first computer 118. Typically, the subscriber access is through a web-browser user interface running on first computer 118 through a series of operations beginning with requesting 902 web page information. An exchange of information occurs with provisioning server 242 supplying 904 the requested web page containing at least one user entry field, the subscriber entering information, and then submitting 906 a filled web-page. The subscriber enters identifying information to indicate the subscriber is a valid customer and flow 1000 continues with provisioning server 242 locating 1014 a subscriber record corresponding to the subscriber entered identifying information. Flow 1000 continues with provisioning server 242 sending 1016 a resynchronization message 912 including a URL for configuration server 246 to first computer 118.

Since the resynchronization message was sent to the first computer 118, which was not the intended target, flow 1000 continues with redirecting 1018 the resynchronization message to CPE 114 on the local area network associated with first computer 118. Flow 1000 continues by CPE 114 acquiring 1020 the URL for configuration sever 244 by extracting the URL from the resynchronization message. Flow 1000 continues with CPE 114 connecting 1022 to configuration server 246 by opening 502 a TLS connection to the configuration server 246 specified in the resynchronization message.

In this case, mutual authentication succeeds since provisioning server 242 has updated configuration server 246 with subscriber data corresponding to CPE 114. After mutual authentication, the session encryption is established as a part of the TLS protocol, as previously discussed. Once the secure TLS connection is established, flow 1000 continues with CPE 114 acquiring 1024 configuration data from configuration server 246 by sending 508 a request configuration data message and receiving 510 a configuration data message including configuration data for CPE. The process of opening the TLS connection and receiving the configuration response is described in reference to FIG. 5.

In cases of receiving configuration information from initialization server 244 or configuration server 246, it is possible to receive more than one URL indicating the desired subscriber configuration data is found in more than one location either on the same or a different configuration server 246. In this case, operation 1024 further includes sending 914 a request configuration data message, and receiving 916 a receive configuration data message. Once all configuration data is requested and received, operation 1024 concludes with closing 512 the TLS connection. Once all of the configuration data is assembled from one or more sources, flow 1000 concludes with initializing 1026 the CPE 114 using the received subscriber configuration data.

Figure 12:
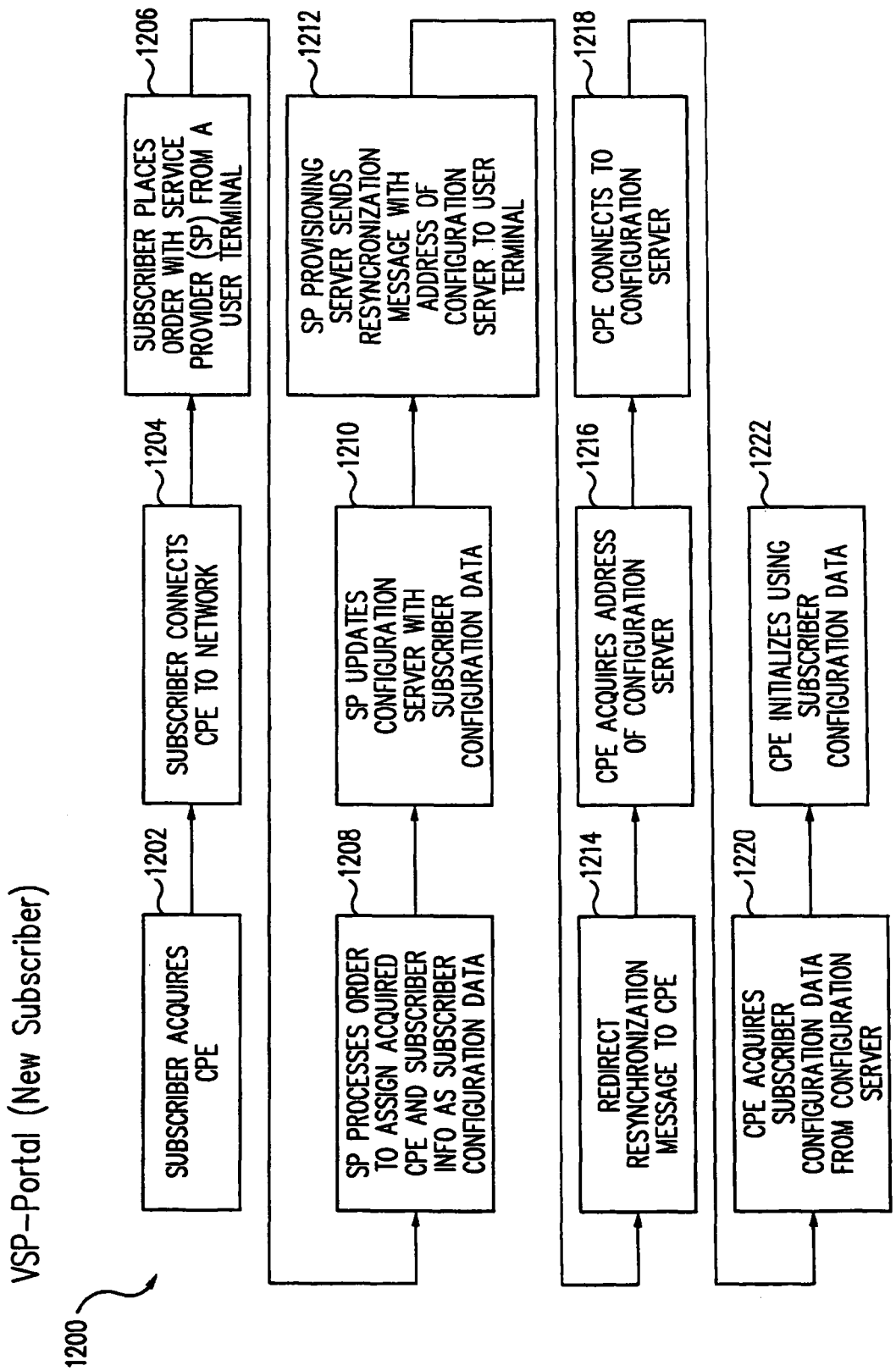
FIG. 12 shows a flow diagram describing a series of operations comprising a provisioning flow for a VSP-portal new subscriber in accordance with an embodiment of the invention.

According to an embodiment of the present invention, a fourth scenario for provisioning VoIP services a fourth scenario is termed VSP-Portal for a new subscriber. FIG. 12 shows a flow diagram describing a series of operations comprising a provisioning flow 1200 for a VSP-portal new subscriber. Flow 1200 includes a number of operations, including the subscriber acquiring 1202 an unassigned CPE 114 device, and connecting 1204 the unassigned CPE 114 to an active network.

Flow 1200 continues with the subscriber placing 1206 an order for VoIP service with a voice service provider (VSP). The subscriber can place an order with the selected VSP by accessing a web-site interface using a web-site browser running on first computer 118, for example. Flow 1200 continues with the VSP processing 1208 the order to assign the acquired CPE 114 and the subscriber information as subscriber configuration data. Once the VSP order is received, the VSP order is processed by updating 1210 configuration server 246 with the subscriber configuration data. Flow 1200 continues with provisioning server 232 sending 1212 a resynchronization message including a URL for configuration server 246 to first computer 118, as discussed above, and continues with redirecting 1214 the resynchronization message from first computer 118 to CPE 114. Flow 1200 continues with the CPE 114 acquiring 1216 a URL for configuration server 246, as discussed above. Flow 1200 continues by CPE 114 connecting 1218 to configuration server 246 and acquiring 1220 the configuration data. Flow 1200 concludes with initializing 1222 the CPE 114 using the acquired subscriber configuration data to complete VoIP provisioning for a VSP-Portal new subscriber.

Figure 13:
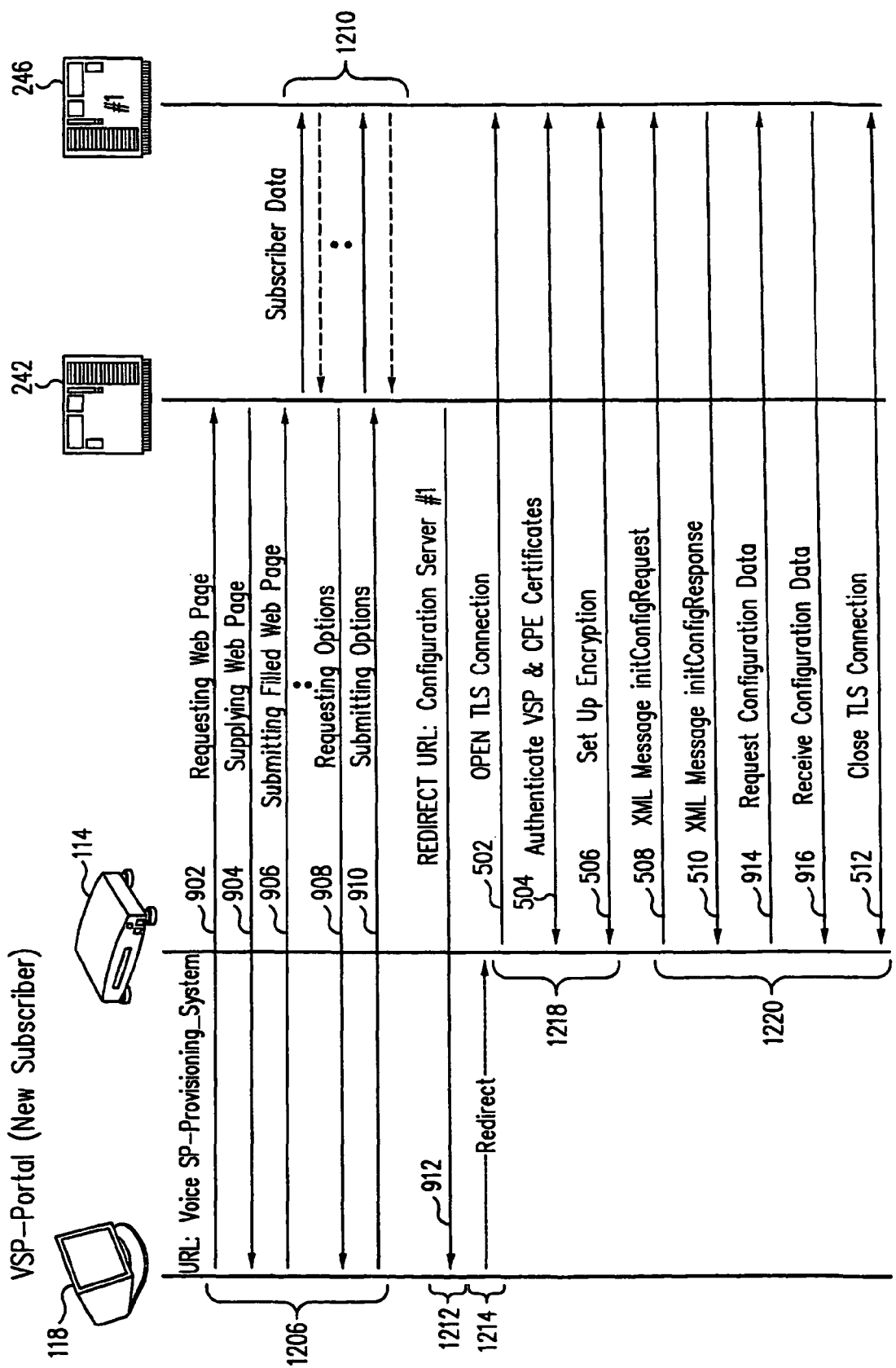
FIG. 13 shows an exemplary transaction diagram for a portion of the VSP-portal provisioning flow following the operation of connecting the unassigned CPE to an active network in accordance with an embodiment of the invention.

FIG. 13 shows an exemplary transaction diagram for a portion of the VSP-portal provisioning flow 1200 following the operation of connecting 1204 the unassigned CPE 114 to an active network. Flow 1200 continues with the subscriber placing 1206 an order through a VSP web portal from first computer 118. Typically, the subscriber places the order through a web-browser user interface running on first computer 118 through a series of operations including requesting 902 web page information, provisioning server 242 supplying 904 the requested web page containing at least one user entry field, and the subscriber submitting 906 a filled web-page containing the entered subscriber information.

Flow 1200 continues with VSP processing 1208 the subscriber order including the assignment of CPE 114 to the subscriber account along with other subscriber account information, followed by updating 1210 the configuration servers (244, 246). The process of updating 1210 can begin before all of the subscriber information is entered in order to reduce the actual processing latency, as well as to verify the coherency of the submitted information. It is possible, for example, that the subscriber makes an error inputting the requested information. By verifying the entered information nearly immediately, undue delays may be avoided due to human error.

As shown in FIG. 13, Flow 1200 continues with provisioning server 242 sending 1212 a resynchronization message 912 including a URL for configuration server 246 to first computer 118, and redirecting 1214 the resynchronization message to CPE 114 on the local area network associated with first computer 118, as discussed above. Flow 1200 continues by CPE 114 acquiring 1216 the URL for configuration sever 244 by extracting the URL from the resynchronization message. Flow 1200 continues with CPE 114 connecting 1218 to configuration server 246 by opening 502 a TLS connection to the configuration server 246 specified in the resynchronization message. Mutual authentication succeeds since provisioning server 242 has updated configuration server 246 with subscriber data corresponding to CPE 114. After mutual authentication, the session encryption is established as a part of the TLS protocol, as previously discussed.

Once the secure TLS connection is established, flow 1200 continues with CPE 114 acquiring 1220 configuration data from configuration server 246 by sending 508 a request configuration data message and receiving 510 a configuration data message including configuration data for CPE. The process of opening the TLS connection and receiving the configuration response is described in reference to FIG. 5. However, in cases of receiving configuration information from initialization server 244 or configuration server 246, it is possible to receive more than one URL indicating the desired configuration data is distributed in more than one location either on the same or a different configuration server 246. In this case, operation 1220 further includes sending 914 a request configuration data message, and receiving 916 a receive configuration data message. Once all configuration data is requested and received, operation 1220 concludes with closing 512 the TLS connection. Once all of the configuration data is assembled from one or more sources, flow 1200 concludes with initializing 1222 the CPE 114 using the received subscriber configuration data.

Figure 14:
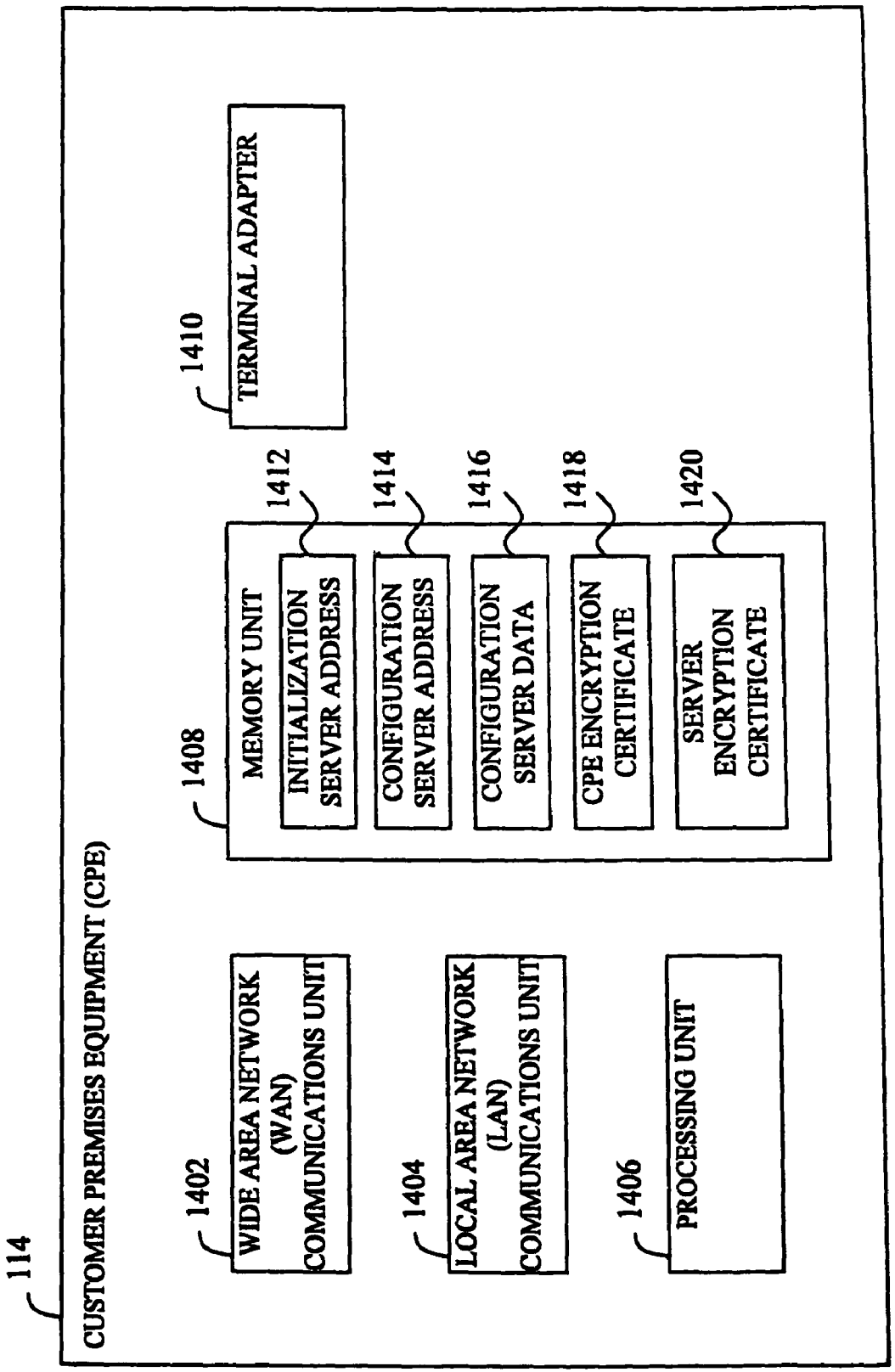
FIG. 14 shows a block diagram of a customer premises equipment (CPE) apparatus 114 in accordance with an embodiment of the present invention.

FIG. 14 shows a block diagram of a customer premises equipment (CPE) apparatus 114 in accordance with an embodiment of the present invention. CPE 114 includes a wide area network (WAN) communications unit 1402 for communications over a WAN, a local area network (LAN) communications unit 1404 for communications over a LAN, a processing unit 1406 for moving and manipulating data within CPE 114 and for controlling the sending and receiving of messages through the WAN communications unit 1402 and the LAN communications unit 1404, a memory unit 1408 for storing and retrieving data, and a terminal adapter 1410 for interfacing with a user terminal. Processing unit 1406 can be a suitably programmed microprocessor or microcomputer. Memory unit 1408 can be any device that is enabled to store and retrieve information including an initialization address 1412, a configuration server address 1414, configuration server data 1416, a CPE encryption certificate 1418, and one or more server encryption certificates 1420. Typically, memory unit 1408 can include a random access memory (RAM), read only memory (ROM), magnetic recording and reproducing device, or electrically alterable storage and retrieval device such as an electrically erasable programmable ROM (EEPROM).

As shown and described in reference to FIGS. 1-6 and FIG. 14, WAN communications unit 1402 can be a first communications unit that sends and receives messages over the WAN under the control of processing unit 1406. WAN communications unit 1402 sends one or more request messages to initialization server 244 at an initialization server address 1412, receives one or more response messages from initialization server 244 containing a configuration server address 1414, sends one or more request messages to the configuration server 246 at the configuration server address 1414, and receives one or more response messages from configuration server 246 containing configuration data 1416.

Memory unit 1408 stores and retrieves information under the control of processing unit 1406. The information stored in memory unit 1408 can include initialization server address 1412 corresponding to a network address for initialization server 244 such as a uniform resource locator (URL) for use on the world wide web (WWW). Initialization server address 1412 is stored in memory unit 1408 prior to sending one or more request messages to initialization server 244. As described, CPE 114 can be pre-programmed prior to delivery to a user in order to access only one service provider. Processing unit 1406 retrieves initialization server address 1412 from memory unit 1408 and passes that information to WAN communications unit 1402 in order to access initialization server 244. Once configuration server data 1416 is received by CPE 114, processing unit 1406 extracts configuration server data 1416 and initializes using the configuration data in order to establish service with a service provider.

As shown in FIG. 3, initialization server address 1412 is retrieved automatically after connection of the CPE apparatus to the WAN. In reference to FIG. 4, a transport layer security (TLS) connection is established to provide a secure connection between CPE 114 and initialization server 244 including the exchange of CPE and initialization server 244 encryption certificates. Similarly, in reference to FIGS. 5-6, a transport layer security (TLS) connection is established to provide a secure connection between CPE 114 and configuration server 246 including the exchange of CPE and configuration server 246 encryption certificates.

As shown and described in reference to FIGS. 1-2, and FIGS. 7-14, CPE 114 includes WAN communications unit 1402 as a first communications unit for sending and receive messages over a WAN under the control of the processing unit 1406. WAN communications unit 1402 receives a resynchronization message that contains configuration server address 1412. As described above, the resynchronization message is sent by provisioning server 242 to the requesting terminal, such as user terminal 118. WAN communications unit 1402 sends one or more request messages to configuration server 246 at configuration server address 1414 and receives one or more response messages from configuration server 246 containing configuration data 1416.

LAN communications unit 1404 as a second communications unit sends and receives messages with WAN communications unit 1402 and over a local area network (LAN) under the control of processing unit 1406. Second communications unit receives the resynchronization message passed from WAN communications unit 1402 and on to a user terminal, such as user terminal 118. LAN communications unit 1404 receives the resynchronization message that is redirected from user terminal 118 back to CPE 114. Processing unit 1406 receives configuration data 1416 and initializing CPE 114 using configuration data 1416 in order to establish service with the service provider.

Although the invention has been described with respect to particular embodiments, this description is only an example of the invention's application and should not be taken as a limitation. Consequently, the scope of the invention is set forth in the following claims.

We claim:

1. A customer premises equipment (CPE) apparatus, comprising:
   a first communications unit adapted to send and receive messages over a public wide area network (WAN), including the Internet, the first communications unit being adapted to:
      establish a transport layer security (TLS) connection with an initialization server using optional TLS functions to send the initialization server a non-generic CPE device certificate, wherein
         the non-generic CPE device certificate includes extended information that uniquely identifies the particular CPE apparatus; and
         the non-generic CPE device certificate is issued by the CPE supplier;
      send a first request message to the initialization server at an initialization server address over the public WAN,
      receive a first response message from the initialization server over the public WAN comprising a configuration server address,
      send a second request message to a configuration server at the configuration server address over the public WAN, and
      receive a second response message from the configuration server over the public WAN comprising a subscriber configuration data;
   a memory unit adapted to store and retrieve information including the initialization server address, the initialization server address being stored in the memory unit prior to sending the request message to the initialization server; and
   a processing unit adapted to:
      control the sending and receiving of messages through the first communications unit,
      retrieve the initialization server address from the memory unit wherein the processing unit automatically retrieves the initialization server address from the memory unit after connection of the CPE apparatus to the public WAN, and wherein:
      according to a scenario termed voice-service-provider (VSP)-locked-provisioned-new-subscriber, the processing unit:
         acquires the configuration server address from the initialization server,
         acquires the subscriber configuration data from the configuration server using the configuration server address; and
         initializes the CPE apparatus with the subscriber configuration data to establish service with a service provider;
      according to a scenario termed VSP-locked-new-subscriber, the processing unit:
         notifies a user that connection to the initialization server is rejected,
         acquires the configuration server address from a resynchronization message from a provisioning server to a user terminal that redirects the resynchronization message to the CPE apparatus from the user terminal,
         acquires an updated subscriber configuration data from the configuration server using the configuration server address; and
         initializes the CPE apparatus with the updated subscriber configuration data to establish service with a service provider;
      according to a scenario termed VSP-portal-provisioned-new-subscriber, the processing unit:
         acquires the configuration server address from the resynchronization message from the provisioning server redirected to the CPE apparatus from the user terminal,
         acquires the subscriber configuration data from the configuration server using the configuration server address; and
         initializes the CPE apparatus with the subscriber configuration data to establish service with a service provider; and
      according to a scenario termed VSP-portal-new-subscriber, the processing unit:
         acquires the configuration server address from the resynchronization message from the provisioning server redirected to the CPE apparatus from the user terminal,
         acquires the updated subscriber configuration data from the configuration server using the configuration server address; and
         initializes the CPE apparatus with the updated subscriber configuration data to establish service with a service provider.

2. The apparatus of claim 1, wherein the exchange of messages between the CPE apparatus and the initialization server establishes a secure connection between the CPE apparatus and the initialization server over the public WAN.

3. The apparatus of claim 2, wherein the memory unit of the CPE apparatus includes a CPE encryption certificate for exchange with the initialization server to establish the secure connection between the CPE apparatus and the initialization server over the public WAN.

4. The apparatus of claim 2, wherein the processing unit of the CPE apparatus authenticates an initialization server encryption certificate to establish the secure connection between the CPE apparatus and the initialization server over the public WAN.

5. The apparatus of claim 1, wherein the public WAN conforms to Internet Protocol (IP) for sending and receiving messages over the public WAN.

6. The apparatus of claim 1, further comprising:
   a terminal adapter configured to convert signals from a user interface into messages that are sent through the CPE apparatus over the public WAN and to convert messages received from the public WAN through the CPE apparatus into signals to the user interface.

7. The apparatus of claim 6, wherein the service provider is a voice service provider (VSP), and wherein the user interface includes a telephone.

8. The apparatus of claim 6, wherein the service provider is an Internet based service carrier, and wherein the user interface is a computer.

9. The apparatus of claim 6, wherein the user interface includes a video monitor for receiving a video signal input and producing one of a visual and an auditory output.

10. The apparatus of claim 9, further comprising:
a camera operatively connected to the terminal adapter, the camera capturing a visual image and producing a video signal output, the terminal adapter receiving the video signal output and producing at least one message for sending over the network.

11. A method of establishing service between a customer premises equipment (CPE) unit and a service provider, comprising:
connecting the CPE unit to a public wide area network (WAN), including the Internet;
automatically retrieving an initialization server network address from a local memory unit that identifies the network location of a service provider initialization server;
establishing a transport layer security (TLS) connection with the initialization server using optional TLS functions to send the initialization server a non-generic CPE device certificate, wherein
the non-generic CPE device certificate includes extended information that uniquely identifies the particular CPE apparatus; and
the non-generic CPE device certificate is issued by the CPE supplier;
accessing the initialization server over the public WAN using the retrieved initialization server network address;
according to a scenario termed voice-service-provider (VSP)-locked-provisioned-new-subscriber:
acquiring the configuration server address from the initialization server,
acquiring the subscriber configuration data from the configuration server using the configuration server address; and
initializing the CPE apparatus with the subscriber configuration data to establish service with a service provider;
according to a scenario termed VSP-locked-new-subscriber:
notifying a user that connection to the initialization server is rejected,
acquiring the configuration server address from a resynchronization message from a provisioning server to a user terminal that redirects the resynchronization message to the CPE apparatus from the user terminal,
acquiring an updated subscriber configuration data from the configuration server using the configuration server address; and
initializing the CPE apparatus with the updated subscriber configuration data to establish service with a service provider;
according to a scenario termed VSP-portal-provisioned-new-subscriber:
acquiring the configuration server address from the resynchronization message from the provisioning server redirected to the CPE apparatus from the user terminal,
acquiring the subscriber configuration data from the configuration server using the configuration server address; and
initializing the CPE apparatus with the subscriber configuration data to establish service with a service provider; and
according to a scenario termed VSP-portal-new-subscriber:
acquiring the configuration server address from the resynchronization message from the provisioning server redirected to the CPE apparatus from the user terminal,
acquiring the updated subscriber configuration data from the configuration server using the configuration server address; and
initializing the CPE apparatus with the updated subscriber configuration data to establish service with a service provider.

12. The method of claim 11, wherein the service provider is a voice service provider (VSP).

13. A customer premises equipment (CPE) apparatus, comprising:
a first communications unit adapted to send and receive messages over a public wide area network (WAN), including the Internet, the first communications unit being adapted to receive a resynchronization message including a configuration server address over the public WAN, send a request message to a configuration server at a configuration server address over the public WAN, and receive a response message from the configuration server comprising a configuration data over the public WAN;
a second communications unit adapted to send and receive messages with the first communications unit and over a local area network (LAN), the second communications unit receiving the resynchronization message from the first communications unit and passing the resynchronization message to a user terminal, the second communications unit receiving the resynchronization message redirected from the user terminal;
a processing unit adapted to:
control the sending and receiving of messages through the first communications unit and the second communications unit, the processing unit initializing the CPE apparatus with the configuration data to establish service with a service provider, wherein the processing unit automatically retrieves an initialization server address from the memory unit after connection of the CPE apparatus to the public WAN, the processing unit establish a transport layer security (TLS) connection with an initialization server using optional TLS functions to send the initialization server a non-generic CPE device certificate, wherein the non-generic CPE device certificate includes extended information that uniquely identifies the particular CPE apparatus; and the non-generic CPE device certificate is issued by the CPE supplier, and the processing unit sends a request message to the initialization server through the first communications unit; and wherein:
according to a scenario termed voice-service-provider (VSP)-locked-provisioned-new-subscriber, the processing unit:
acquires the configuration server address from the initialization server,
acquires the subscriber configuration data from the configuration server using the configuration server address; and
initializes the CPE apparatus with the subscriber configuration data to establish service with a service provider;

according to a scenario termed VSP-locked-new-subscriber, the processing unit:
  notifies a user that connection to the initialization server is rejected,
  acquires the configuration server address from a resynchronization message from a provisioning server to a user terminal that redirects the resynchronization message to the CPE apparatus from the user terminal,
  acquires an updated subscriber configuration data from the configuration server using the configuration server address; and
  initializes the CPE apparatus with the updated subscriber configuration data to establish service with a service provider;
according to a scenario termed VSP-portal-provisioned-new-subscriber, the processing unit:
  acquires the configuration server address from the resynchronization message from the provisioning server redirected to the CPE apparatus from the user terminal,
  acquires the subscriber configuration data from the configuration server using the configuration server address; and
  initializes the CPE apparatus with the subscriber configuration data to establish service with a service provider; and
according to a scenario termed VSP-portal-new-subscriber, the processing unit:
  acquires the configuration server address from the resynchronization message from the provisioning server redirected to the CPE apparatus from the user terminal,
  acquires the updated subscriber configuration data from the configuration server using the configuration server address; and
  initializes the CPE apparatus with the updated subscriber configuration data to establish service with a service provider; and
a memory unit adapted store and retrieve information including the initialization server address, the initialization server address being stored in the memory unit prior to sending the request message to the initialization server.

14. The apparatus of claim 13, wherein the service provider is a voice service provider (VSP).

15. A method of establishing service between a customer premises equipment (CPE) unit and a service provider, comprising:
  at the CPE unit, connecting the CPE unit to a public wide area network (WAN), the CPE unit configured to send and receive messages over the public WAN;
  at the CPE unit, automatically executing an internal operation to retrieve a stored network address for a service provider initialization server when the CPE unit is connected to the public WAN;
  at the CPE unit, establishing a transport layer security (TLS) connection with the initialization server using optional TLS functions to send the initialization server a non-generic CPE device certificate, wherein
    the non-generic CPE device certificate includes extended information that uniquely identifies the particular CPE apparatus; and
    the non-generic CPE device certificate is issued by the CPE supplier;
  at the CPE unit, accessing the service provider initialization server;
  according to a scenario termed voice-service-provider (VSP)-locked-provisioned-new-subscriber, at the CPE unit:
    acquiring the configuration server address from the initialization server,
    acquiring the subscriber configuration data from the configuration server using the configuration server address; and
    initializing the CPE apparatus with the subscriber configuration data to establish service with a service provider;
  according to a scenario termed VSP-locked-new-subscriber, at the CPE unit:
    notifying a user that connection to the initialization server is rejected,
    acquiring the configuration server address from a resynchronization message from a provisioning server to a user terminal that redirects the resynchronization message to the CPE apparatus from the user terminal, and
    acquiring an updated subscriber configuration data from the configuration server using the configuration server address;
    initializing the CPE apparatus with the updated subscriber configuration data to establish service with a service provider;
  according to a scenario termed VSP-portal-provisioned-new-subscriber, at the CPE unit:
    acquiring the configuration server address from the resynchronization message from the provisioning server redirected to the CPE apparatus from the user terminal,
    acquiring the subscriber configuration data from the configuration server using the configuration server address; and
    initializing the CPE apparatus with the subscriber configuration data to establish service with a service provider; and
  according to a scenario termed VSP-portal-new-subscriber, at the CPE unit:
    acquiring the configuration server address from the resynchronization message from the provisioning server redirected to the CPE apparatus from the user terminal,
    acquiring the updated subscriber configuration data from the configuration server using the configuration server address; and
    initializing the CPE apparatus with the updated subscriber configuration data to establish service with a service provider.

16. The method of claim 15, wherein the service provider is a voice service provider (VSP).

17. The method of claim 15, wherein the user terminal and the CPE communicate over a local area network (LAN).

18. The method of claim 15, further comprising:
  detecting whether the public network is active; and
  opening a secure connection with the initialization server.

19. The method of claim 18, wherein opening a secure connection further comprises:
  exchanging security certificates including encrypted information, a CPE security certificate including device specific information to allow a service provider initialization server to verify whether a specific CPE is authorized; and
  mutually authenticating the validity of the exchanged security certificates,
  wherein the secure connection with the initialization server is closed if one of the CPE unit and the initialization server fail in mutual authentication.

* * * * *